US012302154B2

(12) United States Patent
Thangarasa et al.

(10) Patent No.: US 12,302,154 B2
(45) Date of Patent: May 13, 2025

(54) UE POWER SAVING MECHANISM UNDER EARLY MEASUREMENT REPORTING

(71) Applicant: TELEFONAKTIEBOLAGET LM ERICSSON (PUBL), Stockholm (SE)

(72) Inventors: Santhan Thangarasa, Vällingby (SE); Muhammad Ali Kazmi, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 364 days.

(21) Appl. No.: 17/775,188

(22) PCT Filed: Nov. 7, 2020

(86) PCT No.: PCT/IB2020/060496
§ 371 (c)(1),
(2) Date: May 6, 2022

(87) PCT Pub. No.: WO2021/090281
PCT Pub. Date: May 14, 2021

(65) Prior Publication Data
US 2022/0394532 A1 Dec. 8, 2022

Related U.S. Application Data

(60) Provisional application No. 62/932,254, filed on Nov. 7, 2019.

(51) Int. Cl.
H04W 24/10 (2009.01)
H04W 52/02 (2009.01)

(52) U.S. Cl.
CPC ....... *H04W 24/10* (2013.01); *H04W 52/0209* (2013.01)

(58) Field of Classification Search
CPC ... H04W 24/10; H04W 52/0209; Y02D 30/70
See application file for complete search history.

(56) References Cited

U.S. PATENT DOCUMENTS 12,133,121 B2 * 10/2024 Lee .................. H04W 52/0229
2018/0323884 A1 * 11/2018 Ku ........................ H04W 24/08
(Continued)

OTHER PUBLICATIONS

Catt et al., "WF on Power Saving RRM requirements", 3GPP TSG-RAN WG4 Meeting #92bis, R4-1910948, Chongqing, China, Oct. 14-18, 2019.
(Continued)

*Primary Examiner* — Rasheed Gidado
(74) *Attorney, Agent, or Firm* — Sage Patent Group

(57) ABSTRACT

Systems and methods for providing power savings at a wireless communications device in coordination with early measurement reporting are disclosed. In one embodiment, a method performed by a wireless communication device comprises obtaining first information for determining whether the wireless communication device meets criteria for entering into one or more relaxed measurement modes and obtaining second information about whether the wireless communication device is configured with early measurement reporting. The method further comprises selecting a measurement mode from a set of measurement modes comprising the one or more relaxed measurement modes and a normal measurement mode. In one embodiment, selecting the measurement mode comprises determining, based on the first information, whether the wireless communication device meets the criteria for entering into the one or more relaxed measurement modes and selecting one of the set of measurement modes based on upon results of the determining and based on the second information.

19 Claims, 13 Drawing Sheets

(56) References Cited

U.S. PATENT DOCUMENTS

| | | | |
|---|---|---|---|
| 2020/0367085 A1* | 11/2020 | Hong | H04W 24/10 |
| 2021/0105647 A1* | 4/2021 | Lee | H04W 36/0094 |
| 2021/0105719 A1* | 4/2021 | Thangarasa | H04W 52/0258 |
| 2022/0131596 A1* | 4/2022 | Sharma | H04B 7/0888 |
| 2022/0167370 A1* | 5/2022 | Chen | H04W 48/16 |
| 2022/0248349 A1* | 8/2022 | Cheng | H04W 24/10 |
| 2023/0239761 A1* | 7/2023 | Wang | H04W 36/304 |
| | | | 370/331 |

OTHER PUBLICATIONS

Nokia et al., "UE core requirements for UE power saving", GPP TSG-RAN WG4 Meeting#92bis, R4-1912130, Chongqing, China, Oct. 14-18, 2019.

Ericsson, "Email discussion [105#53] [LTE_NR_DC_CA_enh-Core] Early measurements Signaling", 3GPP TSG-RAN WG2 Meeting #105bis, R2-19xxxxx, Apr. 8-12, 2019, Xi'an, China.

Huawei et al., "Discussion on Aperiodic idle mode measurements" 3GPP TSG-RAN WG2 Meeting #103, R2-1812092, Aug. 20-24, 2018, Gothenburg, Sweden.

LG Electronics, et al., "Coexistence of measurement relaxation and early measurements", 3GPP TSG-RAN WG2 Meeting #109-e, R2-2001401, Feb. 24-Mar. 6, 2020, Online.

Mediatek Inc. "Report of email discussion [105bis#29][NR/Power Saving] RRM solutions", 3GPP TSG-RANWG2 Meeting #106, R2-1908249, May 13-17, 2019, Reno, NV, USA.

Sony, "RRM measurements for UE power saving", 3GPP TSG RAN WG2 Meeting #105, R2-1901427, Feb. 25-Mar. 2, 2019, Athens, Greece.

* cited by examiner

Example scenarios in which early measurement reporting BW and relaxed measurement mode BW fully overlap, do not overlap and partly overlap

UE POWER SAVING MECHANISM UNDER EARLY MEASUREMENT REPORTING

RELATED APPLICATIONS

This application is a national phase application of International Patent Application No. PCT/IB2020/060496, filed Nov. 7, 2020, which claims the benefit of U.S. Provisional Patent Application No. 62/932,254, filed Nov. 7, 2019, the disclosures of which are hereby incorporated herein by reference in their entirety.

TECHNICAL FIELD

The present disclosure relates to a cellular communications system and, more specifically, to User Equipment (UE) power savings mechanisms and early measurement reporting in a cellular communications system.

BACKGROUND

In Long Term Evolution (LTE), early measurement reporting (EMR) was introduced for RRC_IDLE state on the Evolved Universal Terrestrial Radio Access (E-UTRA) carrier/cell level. A User Equipment (UE) capable of EMR is configured with the early measurements via dedicated signaling in a Radio Resource Control (RRC) Release message or broadcast information, particularly System Information Block (SIB) 5, denoted "SIB5." Early measurements are performed by the UE in RRC_IDLE state. The UE knows that a cell supports EMR via a cell support indication in SIB2. Validity area configuration is optional. The UE indicates measurement availability for EMR in Msg5. The EMR occurs when the UE is in RRC_CONNECTED state and is implemented through UEInformationRequest/UEInformationResponse messaging.

The UE is provided with a carrier frequencies list (measIdleCarrierListEUTRA) and performs such early measurements for each entry in measIdleCarrierListEUTRA, provided the UE supports carrier aggregation between the serving carrier and the carrier frequency and bandwidth indicated by carrierFreq and allowedMeasBandwidth within the corresponding entry. Otherwise, e.g., if it is a not supported combination, the UE does not consider the carrier frequency to be applicable for EMR.

If the UE is provided with the cell list (measCellList) for early measurements, then the UE considers the serving cell and cells identified by each entry within the measCellList to be applicable for EMR. Otherwise, the UE considers the serving cell and up to maxCellMeasIdle strongest identified cells whose Reference Signal Received Power (RSRP)/Reference Signal Received Quality (RSRQ) measurement results are above the value(s) provided in qualityThreshold (if any) to be applicable for EMR.

The UE is configured with a duration timer T331, which in LTE is 10-300 seconds, via dedicated RRC signaling. Upon expiration or stopping of T331, the UE releases the dedicated configuration for early measurements. But whether to continue the early measurements according to SIB5 configuration after T331 has expired or stopped is determined by UE implementation. According to Third Generation Partnership Project (3GPP) Technical Specification (TS) 36.133 v15.8.0, while T331 is running, the UE is to perform such measurements on the configured overlapping and non-overlapping inter-frequency carriers. In the absence or expiration of T331, it is up to UE implementation to perform early measurements.

In 3GPP Release 16, EMR is being introduced for measurements on Evolved Universal Terrestrial Access (E-UTRA) and New Radio (NR) carriers to facilitate multi-carrier operation with NR, e.g., NR Carrier Aggregation (CA) or Multi-Radio Access Technology (RAT) Dual Connectivity (DC), which is denoted "MR-DC". The measurements can be performed in RRC_IDLE or RRC_INACTIVE. The measurement report should preferably be sent as early as possible, but the UE is not allowed to send information that can be used to determine UE location before security activation. This implies that a UE coming from RRC_IDLE can send such information after SecurityModeCommand, a UE coming from RRC_IDLE with stored context (LTE Release 13) can send such information after processing the RRC Resume message, and a UE coming from NR RRC_INACTIVE can send such information after transmission of the RRC Resume Request message (i.e. before reception of the RRC Resume message). In Option 1, the UE sends the measurement report immediately after the SecurityModeCommand. In Option 2, the UE sends the measurement report after the RRCConnectionReconfigurationComplete/RRCReconfigurationComplete message.

For RRC_INACTIVE, in Option 1, UEInformationRequest/Response can be used after resume to request inactive mode measurements; in Option 2, the network can request inactive measurements in RRCResume, and UE then report early measurements in RRCResumeComplete.

In both LTE and NR, the purpose of the EMR is to enable the network node (e.g. serving evolved Node B (eNB) or serving Next Generation Node B (gNB)) to use the results to quickly setup or establish the multicarrier operation (e.g. carrier aggregation, multi-connectivity, etc.); that is to configure the UE with one or more Secondary Cells (SCells) and/or special SCell (spSCell) such as a Primary Secondary Cell (PSCell). These SCells can then also be directly activated. Without EMR, the network node has to configure the UE to perform and report measurements on one or more carriers after the UE is in the connected state, only after which SCells can be configured and then activated. This significantly delays the setup of multicarrier operation.

Another aspect of the 3GPP specifications is relaxed monitoring criteria for a cell. The relaxed monitoring criteria for a neighbor cell are specified in 3GPP TS 36.304 v15.2.0. When the UE is required to perform intra-frequency or inter-frequency measurement, the UE may choose not to perform intra-frequency or inter-frequency measurements when:

the relaxed monitoring criterion is fulfilled for a period of $T_{SearchDeltaP}$, and less than 24 hours have passed since measurements for cell reselection were last performed, and the UE has performed intra-frequency or inter-frequency measurements for at least $T_{SearchDeltaP}$ after selecting or reselecting a new cell.

The relaxed monitoring criterion is fulfilled when:

$$(Srxlev_{Ref} - Srxlev) < S_{SearchDeltaP}$$

where:

$S_{SearchDeltaP}$ is threshold (in dB) on Srxlev variation for relaxed measurement;

Srxlev=current Srxlev value of the serving cell (dB);

$Srxlev_{Ref}$=reference Srxlev value of the serving cell (dB), set as follows:

After selecting or reselecting a new cell, or

If $(Srxlev - Srxlev_{Ref}) > 0$, or

If the relaxed monitoring criterion has not been met for $T_{SearchDeltaP}$:

the UE shall set the value of $Srxlev_{Ref}$ to the current Srxlev value of the serving cell;

$T_{SearchDeltaP}$=5 minutes, or the eDRX cycle length if eDRX is configured and the eDRX cycle length is longer than 5 minutes.

SUMMARY

Systems and methods for providing power savings at a wireless communications device in coordination with early measurement reporting are disclosed. In one embodiment, a method performed by a wireless communication device in a cellular communications system comprises obtaining first information for determining whether the wireless communication device meets one or more criteria for entering into one or more relaxed measurement modes and obtaining second information about whether the wireless communication device is configured with early measurement reporting. The method further comprises selecting a measurement mode from a set of measurement modes comprising the one or more relaxed measurement modes and a normal measurement mode. In one embodiment, selecting the measurement mode comprises determining, based on the first information, whether the wireless communication device meets the one or more criteria for entering into the one or more relaxed measurement modes and selecting one of the set of measurement modes based on upon results of determining whether the wireless communication device meets the one or more criteria for entering into the one of the one or more relaxed measurement modes and based on the second information. In this manner, power saving operations and early measurement reporting operates can be coordinated, e.g., so as to not degrade the performance of early measurement reporting when the wireless communication device is performing operations to provide power saving.

In one embodiment, determining whether the wireless communication device meets the one or more criteria for entering into the one or more relaxed measurement modes comprises determining that the wireless communication device meets the one or more criteria for entering into at least one of the one or more relaxed measurement modes. Selecting the measurement mode further comprises determining, based on the second information, that the wireless communication device is not configured with an early measurement reporting configuration. Selecting the one of the set of measurement modes based on upon results of determining whether the wireless communication device meets the one or more criteria for entering into the one of the one or more relaxed measurement modes and based on the second information comprises selecting one of the at least one of the one or more relaxed measurement modes upon determining that the wireless communication device meets the one or more criteria for entering into the at least one of the one or more relaxed measurement modes and determining that the wireless communication device is not configured with an early measurement reporting configuration.

In one embodiment, selecting the measurement mode further comprises determining, based on the second information, that the wireless communication device is configured with an early measurement reporting configuration. Selecting one of the set of measurement modes based on upon results of determining whether the wireless communication device meets the one or more criteria for entering into the one of the one or more relaxed measurement modes and based on the second information comprises selecting the normal measurement mode upon determining that the wireless communication device is configured with an early measurement reporting configuration.

In one embodiment, selecting the measurement mode further comprises determining, based on the second information, that the wireless communication device is configured with an early measurement reporting configuration but that there is no ongoing early measurement activity at the wireless communication device. Selecting one of the set of measurement modes based on upon results of determining whether the wireless communication device meets the one or more criteria for entering into the one of the one or more relaxed measurement modes and based on the second information comprises selecting one of the one or more relaxed measurement modes upon determining that the wireless communication device meets the one or more criteria for entering into the one of the one or more relaxed measurement modes and determining that the wireless communication device is configured with an early measurement reporting configuration but that there is no ongoing early measurement activity at the wireless communication device. In one embodiment, determining that the wireless communication device is configured with an early measurement reporting configuration but that there is no ongoing early measurement activity at the wireless communication device comprises determining that an early measurement duration timer is not running.

In one embodiment, selecting the measurement mode further comprises determining, based on the second information, that the wireless communication device is configured with an early measurement reporting configuration but and there is an ongoing early measurement activity at the wireless communication device. Selecting one of the set of measurement modes based on upon results of determining whether the wireless communication device meets the one or more criteria for entering into the one of the one or more relaxed measurement modes and based on the second information comprises selecting the normal measurement mode upon determining that the wireless communication device is configured with an early measurement reporting configuration but and there is an ongoing early measurement activity at the wireless communication device. In one embodiment, determining that the wireless communication device is configured with an early measurement reporting configuration and there is an ongoing early measurement activity at the wireless communication device comprises determining that an early measurement duration timer is running.

In one embodiment, the wireless communication device is in an idle or inactive state.

In one embodiment, the one or more relaxed measurement modes are a single relaxed measurement mode.

In one embodiment, the one or more relaxed measurement modes are two or more relaxed measurement modes. In one embodiment, the two or more relaxed measurement modes have different degrees of measurement relaxation.

In one embodiment, each of the one or more relaxed measurement modes is a measurement mode in which one or more parameters of the normal measurement mode are relaxed. In one embodiment, the one or more parameters comprise: (a) a measurement frequency, (b) a measurement duration, (c) a number of carriers or cells on which measurements are to be performed by the wireless communication device, (d) a frequency bandwidth over which the wireless communication device is to perform measurements, or (e) any combination of two or more of (a)-(d).

In one embodiment, the first information for determining whether the wireless communication device meets the one or more criteria for entering into the one or more relaxed measurement modes comprises information related to mobility of the wireless communication device.

In one embodiment, the first information for determining whether the wireless communication device meets the one or more criteria for entering into the one or more relaxed measurement modes comprises information that indicates whether the wireless communication device is located near a cell edge.

In one embodiment, the first information for determining whether the wireless communication device meets the one or more criteria for entering into the one or more relaxed measurement modes comprises an explicit indicator signaled from a network node.

In one embodiment, the first information for determining whether the wireless communication device meets the one or more criteria for entering into the one or more relaxed measurement modes comprises the one or more criteria. In one embodiment, the one or more criteria comprise a criterion that relaxed monitoring is configured or enabled for the wireless communication device. In one embodiment, the one or more criteria comprise one or more mobility related criterion. In one embodiment, the one or more criteria comprise a criterion related to whether the wireless communication device is in a cell edge area or not. In one embodiment, the one or more criteria comprise a criterion that the wireless communication device be explicitly configured to operate in a particular one of the one or more relaxed measurement modes.

In one embodiment, the first information for determining whether the wireless communication device meets the one or more criteria for entering into the one or more relaxed measurement modes comprises Srxlev and SrxlevRef.

In one embodiment, the second information about whether the wireless communication device is configured with early measurement reporting comprises an early reporting measurement configuration of the wireless communication device, information about whether there is an ongoing early measurement activity at the wireless communication device, or both.

In one embodiment, the method further comprises operating in accordance with the selected one of the at least one of the one or more relaxed measurement modes.

Corresponding embodiments of a wireless communication device are also disclosed. In one embodiment, a wireless communication device for a cellular communications system is adapted to obtain first information for determining whether the wireless communication device meets one or more criteria for entering into one or more relaxed measurement modes and obtain second information about whether the wireless communication device is configured with early measurement reporting. The wireless communication device is further adapted to select a measurement mode from a set of measurement modes comprising the one or more relaxed measurement modes and a normal measurement mode. In order to select the measurement mode, the wireless communication device is further adapted to determine, based on the first information, whether the wireless communication device meets the one or more criteria for entering into the one or more relaxed measurement modes and select one of the set of measurement modes based on upon results of determining whether the wireless communication device meets the one or more criteria for entering into the one of the one or more relaxed measurement modes and based on the second information.

In one embodiment, a wireless communication device for a cellular communications system comprises one or more transmitters, one or more receivers, and processing circuitry associated with the one or more transmitters and the one or more receivers. The processing circuitry is configured to cause the wireless communication device to obtain first information for determining whether the wireless communication device meets one or more criteria for entering into one or more relaxed measurement modes and obtain second information about whether the wireless communication device is configured with early measurement reporting. The processing circuitry is further configured to cause the wireless communication device to select a measurement mode from a set of measurement modes comprising the one or more relaxed measurement modes and a normal measurement mode. In order to select the measurement mode, the processing circuitry is further configured to cause the wireless communication device to determine, based on the first information, whether the wireless communication device meets the one or more criteria for entering into the one or more relaxed measurement modes and select one of the set of measurement modes based on upon results of determining whether the wireless communication device meets the one or more criteria for entering into the one of the one or more relaxed measurement modes and based on the second information.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
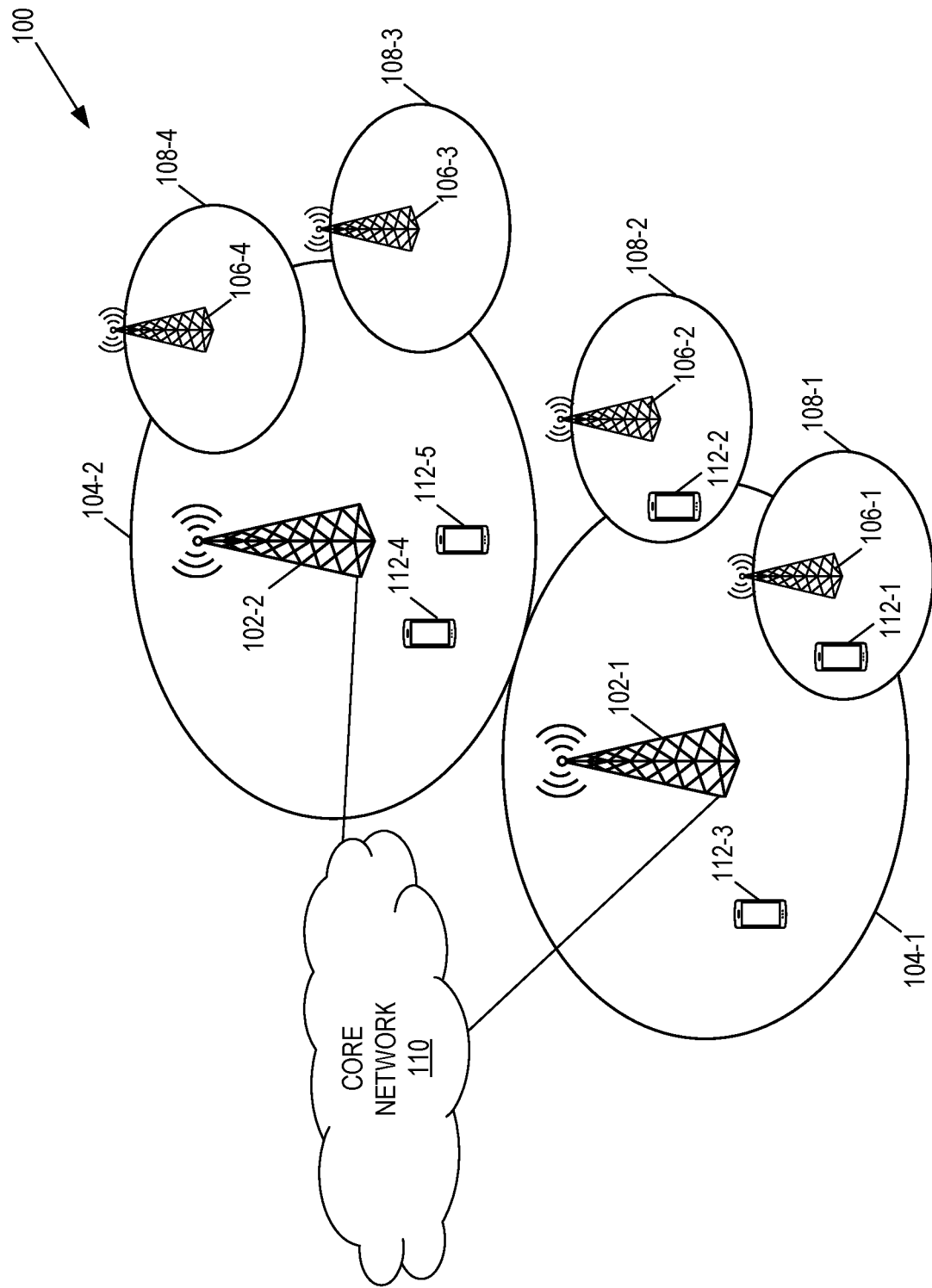
FIG. 1 illustrates one example of a cellular communications system in which embodiments of the present disclosure may be implemented.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In some embodiments, a general term "network node" is used and it can correspond to any type of radio network node or any network node, which communicates with a User Equipment (UE) and/or with another network node. Examples of network nodes are radio network node, gNodeB (gNB), ng-eNB, base station (BS), NR base station, TRP (transmission reception point), multi-standard radio (MSR) radio node such as MSR BS, network controller, radio network controller (RNC), base station controller (BSC), relay, access point (AP), transmission points, transmission nodes, RRU, RRH, nodes in distributed antenna system (DAS), core network node (e.g., MSC, MME, etc.), O&M, OSS, SON, positioning node or location server (e.g., E-SMLC), MDT, test equipment (physical node or software), etc.

A "radio network node" or simply "network node (NW node)", is used. It is capable of transmitting radio signals. It can be any kind of network node which may comprise base station, radio base station, base transceiver station, base station controller, network controller, evolved NodeB (eNB), NodeB, gNodeB (gNB), relay node, access point, radio access point, Remote Radio Unit (RRU) Remote Radio Head (RRH), Central Unit (e.g., in a gNB), Distributed Unit (e.g., in a gNB), Baseband Unit, Centralized Baseband, C-RAN, access point (AP), etc.

In some embodiments the non-limiting term user equipment (UE) or wireless device or wireless communication device is used and it refers to any type of wireless device communicating with a network node and/or with another UE in a cellular or mobile communication system. Examples of UE include a wireless device supporting NR, target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), drone, USB dongles, ProSe UE, V2V UE, V2X UE, etc.

The term "radio node" may refer to radio network node or UE capable of transmitting radio signals or receiving radio signals or both.

The term "time resource" used herein may correspond to any type of physical resource or radio resource expressed in terms of length of time or time interval or time duration. Examples of time resources are: symbol, mini-slot, time slot, subframe, radio frame, TTI, interleaving time, etc.

The term "TTI" used herein may correspond to any time period over which a physical channel can be encoded and interleaved for transmission. The physical channel is decoded by the receiver over the same time period (TO) over which it was encoded. The TTI may also interchangeably called as short TTI (sTTI), transmission time, slot, sub-slot, mini-slot, short subframe (SSF), mini-subframe etc.

The term "multi-carrier operation" used herein can be either a carrier aggregation (CA) or multi-connectivity (MuC) operation. Dual-connectivity (DC) is special case of MuC operation comprises only two cell groups. The aggregated carriers in CA or MuC can belong to the same RAT or to different RATs. In CA the UE is configured with two or more carriers and the UE can have multiple serving cells. The term dual connectivity used herein may refer to the operation mode wherein the UE is configured with two cell groups (CG). Each CG is served or managed by a network node (e.g., gNB, eNB, etc.).

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). According to current specification, the UE in IDLE/INACTIVE state is required to perform Synchronization Signal Reference Signal Received Power (RSRP), which is denoted as "SS-RSRP", and Synchronization Signal Reference Signal Received Quality (RSRQ), which is denoted as "SS-RSRQ", measurement on the serving cell and evaluate the cell selection criterion at least once every $M1*N1$ Discontinuous Reception (DRX) cycle, where:

$M1=2$ if Synchronization Signal Block (SSB) Measurement Timing Configuration (SMTC) periodicity (TSMTC)>20 ms and DRX cycle≤0.64 second, otherwise $M1=1$.

As part of the Release 16 NR UE power saving Work Item (WI) [RP-191607], methods to improve UE power consumption are being introduced. One of the techniques to achieve improved power consumption is relaxing the UE measurement requirements, which comprises requirements for at least serving cell and/or neighbor cell measurements. As one example, the UE can be allowed to measure on cells on different carriers less frequently. In another example, the UE can be allowed to not measure on certain carriers under certain conditions, e.g. provided that the serving cell measurement quality is at least X decibels (dB) better than a threshold, serving cell measurement changes are within a margin, etc. This may affect other UE procedures that take place in, e.g., IDLE/ACTIVE states. If impacts on other procedures are not carefully considered when the UE is in relaxed measurement mode, it could affect the other UE procedures and UE performance can be degraded. For example, it could lead to the UE becoming unable to carry out other procedures or the UE performing other procedures but with degraded performance.

In the present disclosure, the impact of measurement relaxation in IDLE/INACTIVE state on other UE procedures is identified, and solutions to reduce its negative impact on the performance are disclosed. It is noted that same problem may arise also in CONNECTED state if measurement relaxation using similar approach is introduced.

Certain aspects of the present disclosure and its embodiments may provide solutions to the aforementioned or other challenges. Embodiments of one or more methods performed by a wireless communication device (e.g., a UE) and corresponding embodiments of a wireless communication device are disclosed. In addition, embodiments of one or more methods performed by a network node and corresponding embodiments of a network node are also disclosed.

The scenario comprises at least one wireless communication device (e.g., UE) which is operating in a first cell (cell1) served by a network node (NW1) and performing different types of measurements on its serving cell and one or more neighbor cells, e.g., on serving carrier and/or one or more additional configured carriers. It is assumed that wireless communication device is capable of operating in multicarrier operation mode (e.g., in Carrier Aggregation (CA), Dual Connectivity (DC), etc.) and the wireless communication device is further configured with early measurement reporting (EMR) for at least one carrier frequency as described in the Background section above.

In a first embodiment related to a wireless communication device (e.g., UE), the wireless communication device uses at least one criterion to select one out of at least two measurement modes, wherein each measurement mode has its own measurement characteristics such as, e.g., measurement periodicity, measurement requirements, etc. The criterion depends on at least whether or not the wireless communication device is configured with any type of early measurement reporting. In one specific example, the criterion depends on whether or not the wireless communication device in IDLE/INACTIVE state is configured with EMR reporting.

For example:
  If the UE is configured with EMR, then the wireless communication device selects a normal measurement mode (NM). In NM, the wireless communication device is required to measure on at least carriers configured for EMR according to the EMR configuration, e.g., meeting pre-defined EMR requirements.
  But if the wireless communication device is not configured with EMR and the wireless communication device meets all other criteria for entering into a relaxed monitoring mode, then the wireless communication device is allowed to select a relaxed measurement mode (RM). In RM, the wireless communication device is allowed to measure on one or more carriers while meeting relaxed requirements.

In another specific example, the wireless communication device in IDLE/INACTIVE state is configured with EMR reporting but the criteria to enter in the relaxed measurement mode depends on the actual status of the EMR measurements. For example:
  If the wireless communication device is configured with early measurement reporting but there is an ongoing EMR measurements, then the wireless communication device selects a normal measurement mode (NM), or
  If the wireless communication device is configured with early measurement reporting but there is no ongoing EMR measurements and the wireless communication device meets all other criteria for entering into a relaxed monitoring mode, then the wireless communication device is allowed to select a relaxed measurement mode (RM).

In a second embodiment, it is assumed that there are multiple relaxed measurement modes of different orders associated with different requirements (e.g., RM1, where NM is less relaxed than RM1, RM2, RM3 where RM1 is less relaxed than RM2, RM2 is less relaxed than RM3, etc.). For example:
  If the wireless communication device is configured with early measurement reporting, then the wireless communication device is allowed to enter one of the relaxed modes of certain order e.g., RM1, RM2, etc. In this mode, the wireless communication device is allowed to measure on carriers for EMR with less stringent requirements.
  But if the wireless communication device is not configured with EMR, then the wireless communication device is allowed to enter the RM (as in the first embodiment).

Certain embodiments may provide one or more of the following technical advantage(s):
  The performance of CA is not degraded when a UE is performing operations to improve its power saving because the EMR performance is not degraded.
  Improved UE power saving can be achieved while UE is still able to perform EMR reporting.

FIG. 1 illustrates one example of a cellular communications system 100 in which embodiments of the present disclosure may be implemented. In the embodiments described herein, the cellular communications system 100 is a 5G system (5GS) including a NR RAN or LTE RAN (i.e., E-UTRA RAN) or an Evolved Packet System (EPS) including an LTE RAN. In this example, the RAN includes base stations 102-1 and 102-2, which in LTE are referred to as eNBs (when connected to EPC) and in 5G NR are referred to as gNBs or ng-eNBs (i.e., LTE RAN nodes connected to 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5G core (5GC). The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are also referred to as UEs 112.

Now, a description of some example embodiments of the present disclosure will be provided. The scenario comprises at least one UE (e.g., at least one UE 112) which is operating in a first cell (cell1) served by a network node (NW1) (e.g., base station 102) and performing different types of measurements on its serving cell and one or more cells neighbor cells, e.g., on serving carrier and/or one or more additional configured carriers. It is assumed that the UE is capable of operating in multicarrier operation mode (e.g., in CA, DC, etc.) and the UE is further configured to perform EMR on at least one carrier frequency (e.g., NR, LTE, etc.) as described in the Background section above. The UE, upon completing the early measurements, may further store them in its memory, at least for a certain time period. The UE can further be configured or requested (e.g., in RRC resume message) to transmit the results of the early measurements to the network node.

The embodiments described herein may also be implemented in any combination.

Methods in the UE Related to a First Embodiment

Figure 2:
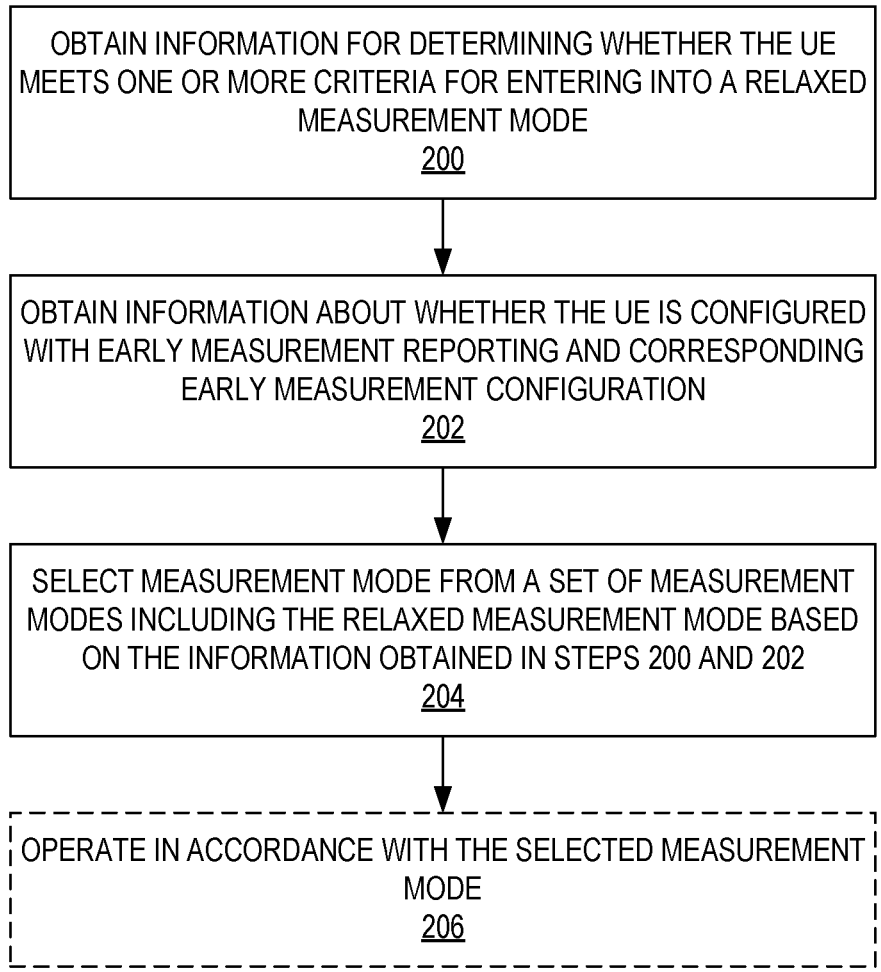
FIG. 2 is a flow chart that illustrates the operation of a User Equipment (UE) in accordance with a first embodiment of the present disclosure.

FIG. 2 is a flow chart that illustrates the operation of a UE (e.g., a UE 112) in accordance with a first embodiment of the present disclosure. As illustrated, the UE performs at least the following steps:

Step 200: The UE obtains information for determining whether (or not) the UE meets one or more criteria for entering into a relaxed measurement mode. In some embodiments, this information comprises at least the one or more criteria to be used by the UE for evaluating whether to enter into the relaxed measurement mode (e.g., one or more criteria for evaluating whether to entering the relaxed measurement mode or otherwise selecting a measurement mode from a set of two or more measurement modes including the relaxed measurement mode and, e.g., a normal measurement mode).

Step 202: The UE obtains information about whether the UE is configured with early measurement reporting and corresponding early measurement configuration e.g., as described in the Background section above. The UE may further obtain information related to its current EMR status or on-going activities in the UE related to EMR.

Step 204: The UE evaluates and selects the measurement mode based on obtained information in steps 200 and 202.

Step 206 (Optional): The UE operates in accordance with the selected measurement mode.

These steps are described in detail below.

Step 200:

In this step, the UE obtains one or more of the following information for determining whether the UE meets the criteria to enter in relaxed measurement mode or not. A relaxed measurement mode is a measurement mode in which one or more parameters of the normal measurement mode are relaxed. The one or more parameters include: (a) a measurement frequency (i.e., a frequency at which the measurements are performed), (b) a measurement duration (i.e., a measurement time period), (c) a number of carriers or cells on which measurements are to be performed by the UE, (d) a frequency bandwidth over which the UE is to perform measurements, or (e) any combination of two or more of (a)-(d). In some embodiments, the UE is allowed to enter in relaxed measurement mode provided at least one of the following criteria is met.

Relax monitoring of a cell: The UE determines whether the UE is configured with the relaxed monitoring for one or more cells. Examples of cells are serving cell, one or more neighbor cells, etc. When the relaxed monitoring is enabled for a cell, then the UE is not required to perform measurement on that cell for certain time period (e.g., 5 minutes) or until the relaxed monitoring is disabled or de-configured for that cell.

One example of criteria for relaxed monitoring is based on the mobility state of the UE. For example, if the UE is stationary, then the UE is allowed to enter in the relaxed monitoring for one or more cells e.g., neighbor cells. The UE therefore obtains information related to UE mobility, which indicates whether it is a mobile or stationary UE. Such information can be explicit information (e.g., higher layer signaling, or subscription data) indicating the mobility state of the UE, e.g., whether it is stationary or mobile.

Information related to UE mobility can also be implicit information indicating the UE mobility. One such example is using the relaxed cell monitoring criterion as defined in TS 36.306 v15.2.0 and described in the Background section above for determining the mobility state of the UE. The relaxed cell monitoring criterion comprises numerous conditions to decide when then the UE can choose not to perform intra-frequency or inter-frequency measurements. The conditions are chosen such that the UE is allowed not to perform intra-frequency and inter-frequency measurements only when the UE has limited mobility, e.g., stationary or substantially stationary as described in the Background section above. When the relaxed monitoring conditions are met, it is an indication that the UE does not move very much or it is stationary. Under such circumstances, the UE is required to only measure on the serving cell, and it is allowed to skip the neighbor cell measurement. The UE can also obtain this information about the UE mobility state from the other nodes, e.g., network node, signaling the mobility state of the UE.

Cell-edge criteria: The UE determines whether it is in cell-edge area of a cell, and uses this information for evaluating or selecting measurement mode. The determination can be based on a comparison between a signal level measured by the UE with respect to cell1 and a threshold. For example, if the measured signal level (e.g., SS-RSRP, SS-RSRQ etc.) is below certain threshold (H), then the UE may assume that it is in the cell edge. Otherwise, the UE is assumed not to be in the cell edge (rather closer to the serving base station). The value of H can be pre-defined or configured by the network node.

Explicit indicator: The UE can also be signaled to operate using a certain measurement mode. Such signaling may come from e.g., the serving network node using dedicated RRC signaling which UE obtains from the CONNECTED state and uses it in IDLE mode. Similar indicator can also be used for selecting measurement modes in CONNECTED mode.

Step 202:

In this step, the UE obtains information related to EMR configuration as described in the Background section above.

The UE may further obtain information related to its current EMR status or on-going activities in the UE related to EMR as described hereinafter. In one embodiment, the UE may assume that there is an ongoing EMR activity (or EMR measurement status is active) in the UE if one or more of following conditions is met:
   there is any ongoing measurement for EMR,
   EMR measurements have started, but not completed,
   the UE has completed the measurements and currently post-processing them,
   the UE has completed the measurements and currently in the process of reporting the measurements,
   EMR measurement timer (e.g., T331 timer) is running. The UE is required to perform EMR measurements at least until the EMR timer is running.

If none of the above conditions is met, then the UE assumes that there is no EMR activity, e.g., EMR measurement status is inactive. For example, if the UE has completed the measurements but it has not yet reported the measurement results for EMR to the network node then the UE may assume that there is no EMR activity.

The above on-going EMR activities are related to the UE measurement procedure. Therefore the UE can obtain any of the above information by retrieving it from its memory.

Steps 204 and 206 (Optional):

In this step, the UE compares the obtained information in previous steps 200 and 202 and selects a measurement mode based on the comparison result.

The UE uses the selected measurement mode for performing one or more operational tasks, e.g., adapt the activity of its transceiver (e.g., turn off its receiver), adapts the measurement procedure etc.

In a first exemplary implementation, the UE is allowed to enter into the relaxed measurement mode provided the following conditions are met:
   the UE meets at least one basic criterion for entering in the relaxed measurement mode (described in step 200), and
   the UE is not configured with any EMR configuration.

Figure 3:
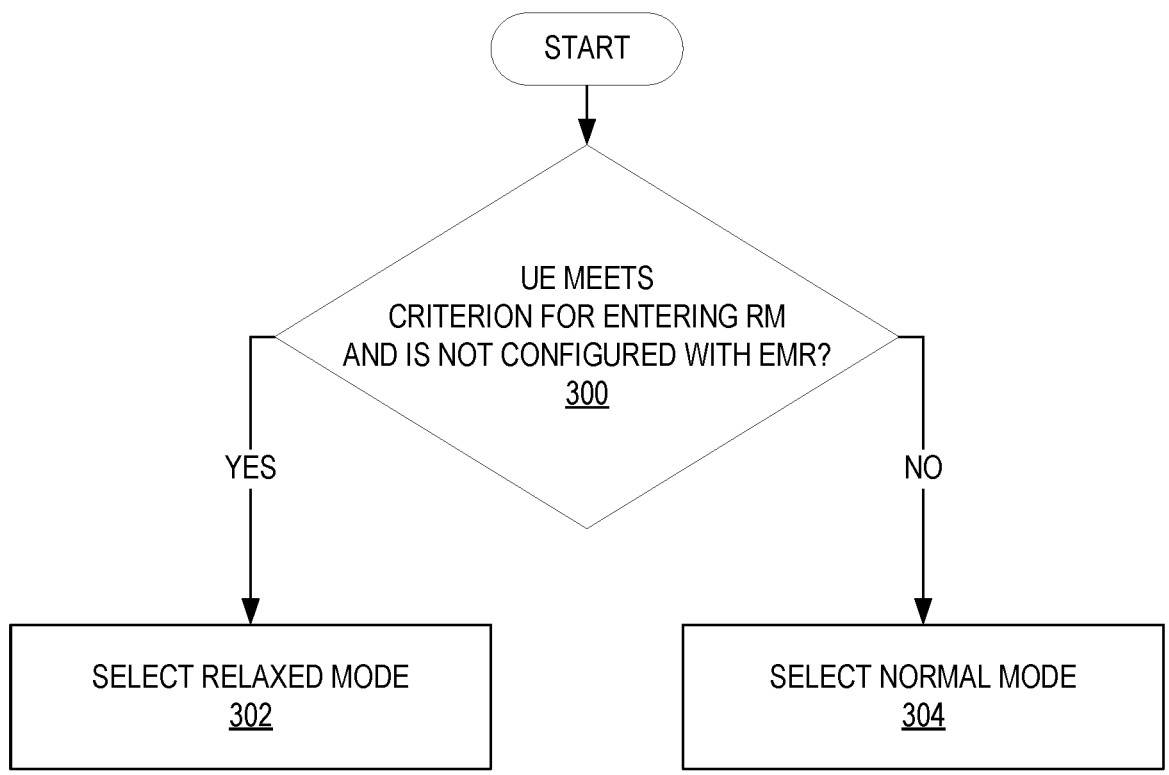
FIG. 3 is a flow chart that illustrates one example embodiment of a measurement mode selection aspect of the process of FIG. 2.

Otherwise (if any of the above conditions is not met), the UE is not allowed to enter into the relaxed measurement mode. Rather, the UE remains in the normal measurement mode. The first exemplary implementation is illustrated in FIG. 3 where the UE determines whether the UE meets at least one basic criterion for entering in the relaxed measurement mode and the UE is not configured with any EMR configuration (step 300). If so, the UE is allowed to enter into the relaxed measurement mode (i.e., the UE selects the relaxed measurement mode) (step 302). Otherwise, the UE is not allowed to enter into the relaxed measurement mode (i.e., the UE selects the normal mode) (step 304). In other words, the UE determines whether the UE meets at least one basic criterion for entering in the relaxed measurement mode. If not, the UE selects the normal measurement mode. If the UE determines that it does meet the at least one basic criterion for entering in the relaxed measurement mode, the UE selects the relaxed measurement mode if the UE is not configured with any EMR configuration and otherwise selects the normal measurement mode. This exemplary implementation is further described with examples below.

In a first example, it is assumed that UE is configured with both relaxed measurement procedures and early measurement reporting procedure. In this case, the UE compares both configurations to determine whether they can be overlapping in a time domain, i.e., whether the configurations allow the UE to be in relaxed measurement mode(s) and at the same time be configured with early measurement reporting. The actions performed by the UE may depend on whether it is fully overlapping, partly overlapping or non-overlapping in time.

If the comparison shows that both relaxed measurement procedures and early measurement reporting procedures are at least partly overlapping in time, then the UE selects a normal measurement mode (NM) regardless of whether or not the UE has fulfilled the criteria for entering a relaxed measurement mode. In NM the UE is required to measure on at least carriers configured for EMR according to the EMR configuration, e.g., meeting pre-defined EMR requirements. The UE may re-evaluate the criteria for entering the relaxed measurement mode after completed EMR.

If the comparison shows that both relaxed measurement procedures and early measurement reporting procedure are non-overlapping in time-domain and the UE meets all other criteria for entering into a relaxed monitoring mode, then the UE is allowed to select a relaxed measurement mode (RM). In RM, the UE is allowed to measure on one or more carriers while meeting relaxed requirements.

Figure 5:
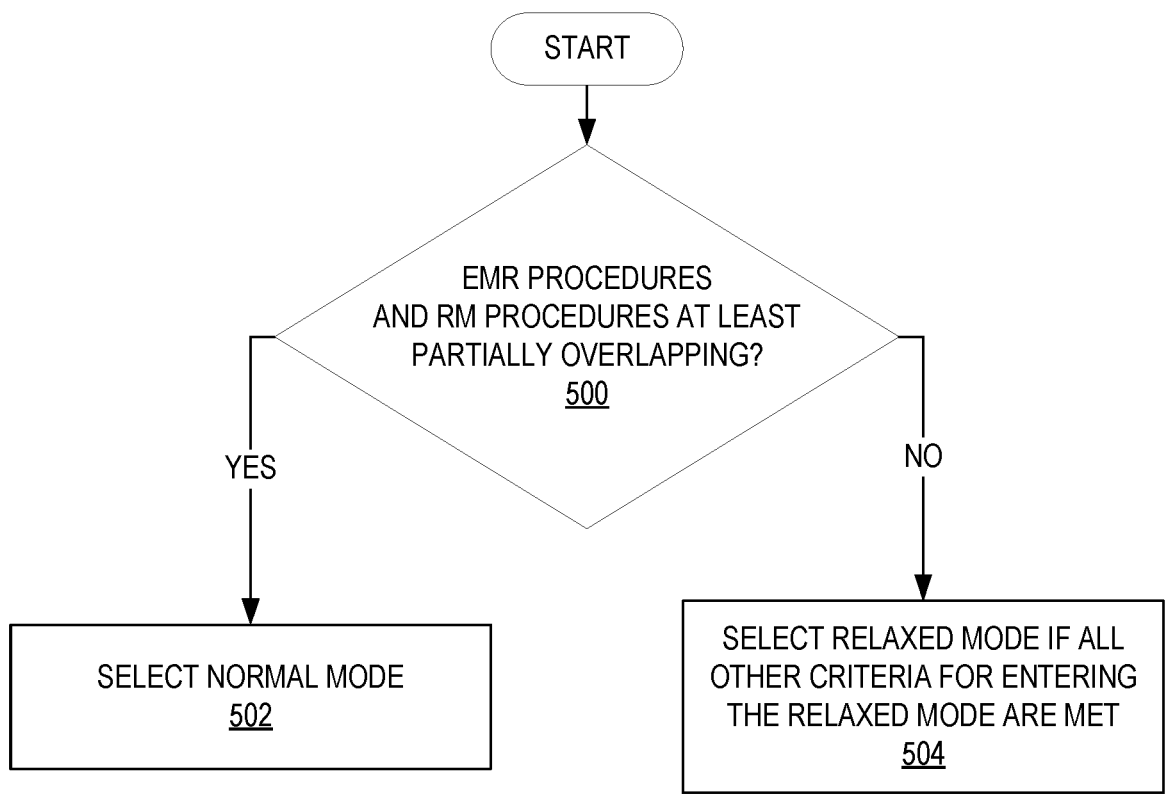
FIG. 5 is a flow chart that illustrates another example embodiment of a measurement mode selection aspect of the process of FIG. 2.

This first example is illustrated in FIG. 5. As illustrated in FIG. 5, the UE determines whether the relaxed measurement procedures and the early measurement procedures are at least partially overlapping in time (step 500). If so, the UE selects the normal measurement mode regardless of whether or not the UE has fulfilled the criteria for entering a relaxed measurement mode, as described above (step 502). Otherwise, the UE is selects a relaxed measurement mode if the UE meets all other criteria for entering into the relaxed measurement mode (step 504).

The comparison can also be performed in the frequency domain. In this case, it is assumed that the UE is only measuring over a limited bandwidth, e.g., fewer BWPs, fewer PRBs, fewer subcarriers when it is in the relaxed measurement mode than in legacy operation (in NM mode). The measured part of the BW is denoted by $B_m$. If the comparison shows that the BW to be measured for EMR ($B_{EMR}$) and $B_m$ overlap, then the UE is allowed to enter the relaxed measurement mode (RM) since the UE is anyway required to measure on those resources, this correspond to case A in FIG. 4. Therefore, it does not lead to any additional cost in terms of the UE power consumption.

Figure 4:
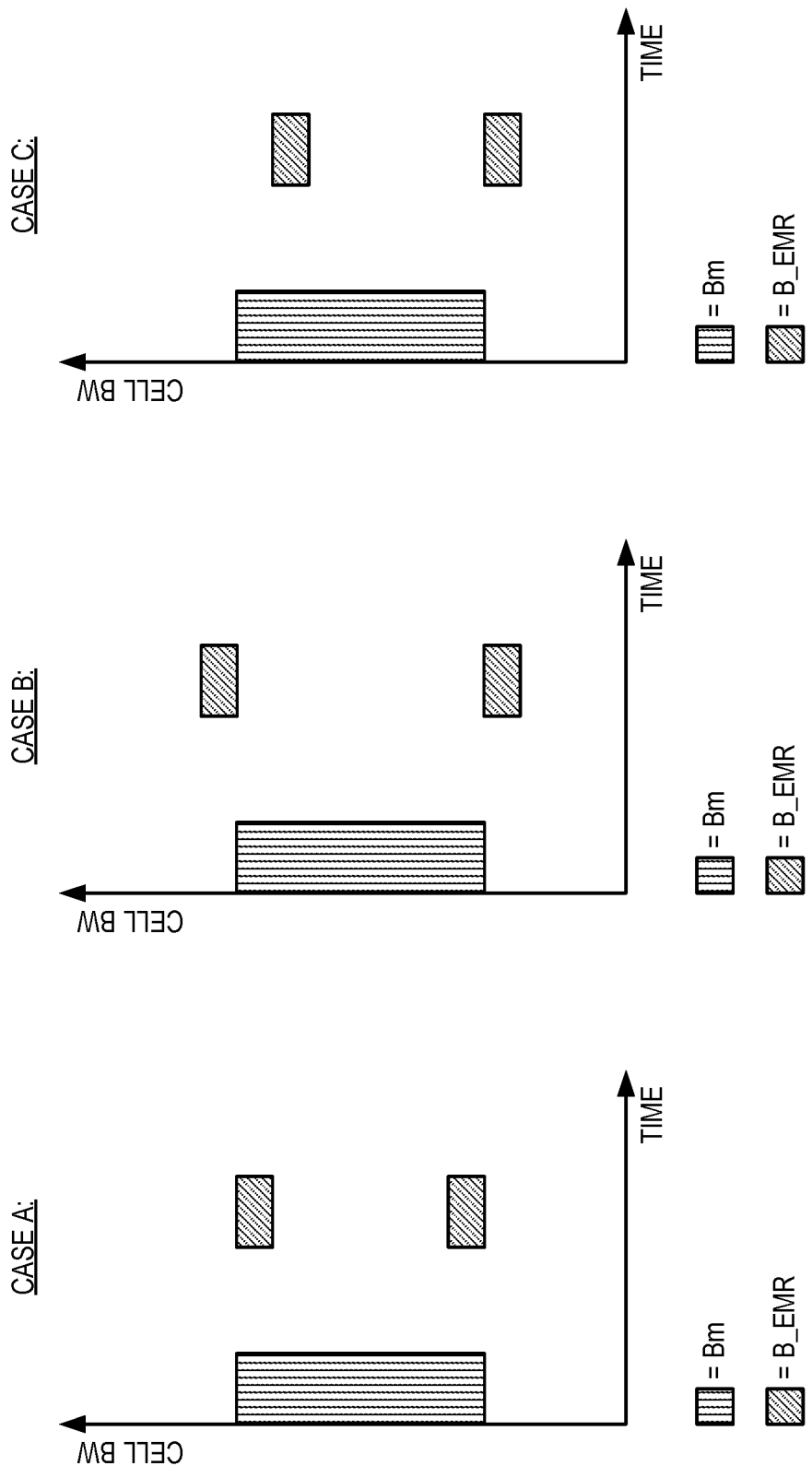
FIG. 4 illustrates example scenarios in which early measurement reporting bandwidth and relaxed measurement mode bandwidth fully overlap, do not overlap, and partly overlap.

On the other hand, if the $B_{EMR}$ and $B_m$ do not overlap in frequency domain corresponding to Case B in FIG. 4, then the UE remains in the NM mode or selects the NM mode regardless of whether or not the UE has fulfilled the criteria for entering a relaxed measurement mode. In NM mode, UE will measure on at least carriers configured for early measurement reporting according to the EMR configuration e.g., meeting pre-defined EMR requirements.

In another (second) exemplary implementation, whether the UE is allowed to enter into the relaxed measurement mode or not depends on at least the actual status of the EMR measurements (i.e. whether EMR measurements are completed or not by the UE). This second alternative is explained below.

For example, in the second exemplary implementation, the UE is allowed to enter into the relaxed measurement mode provided the following conditions are met:
   the UE meets at least one basic criterion for entering in the relaxed measurement mode (described in step 1) and
   the UE is configured with EMR configuration but there is no ongoing EMR measurements (e.g., EMR measurement status is inactive).

Figure 6:
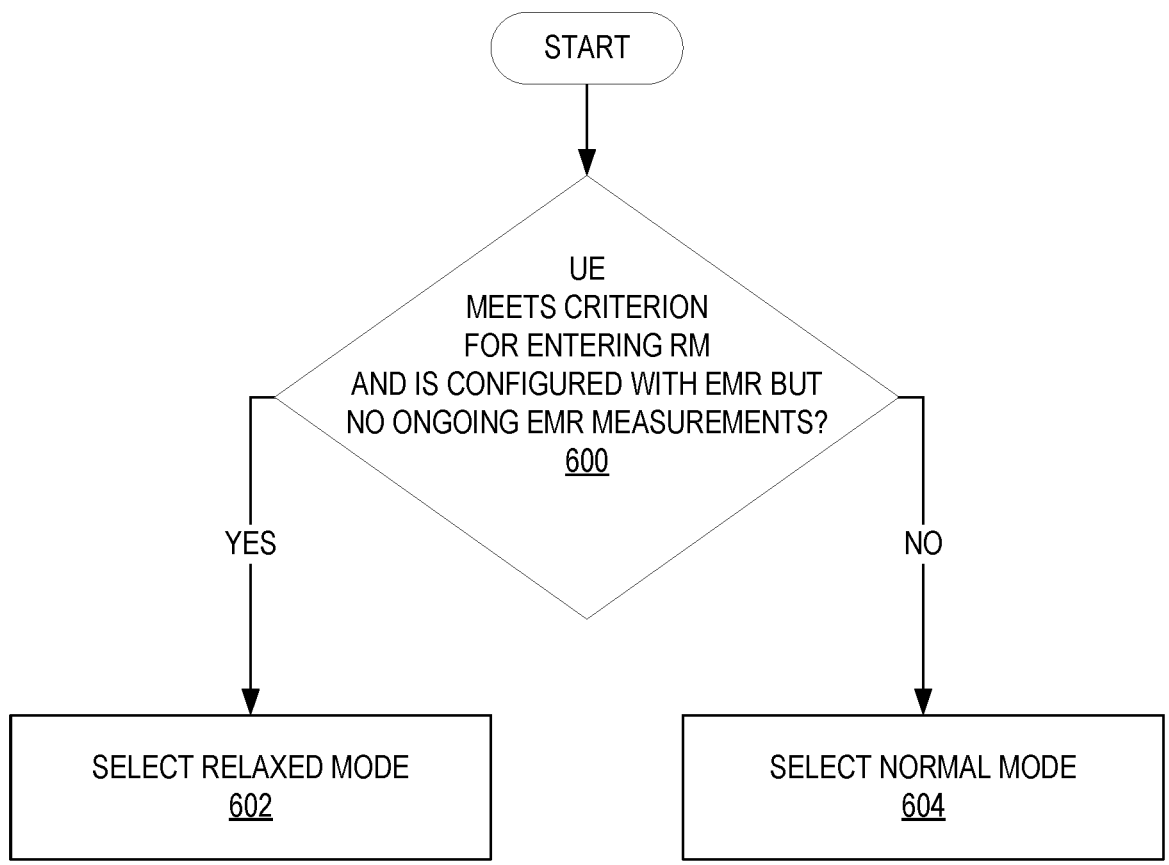
FIG. 6 is a flow chart that illustrates another example embodiment of a measurement mode selection aspect of the process of FIG. 2.

Otherwise (if any of the above conditions is not met), then the UE is not allowed to enter into the relaxed measurement mode; rather the UE remains in the normal measurement mode. This second exemplary implementation is illustrated in FIG. 6. As illustrated, the UE determines whether the UE meets at least one basic criterion for entering in the relaxed measurement mode and the UE is configured with EMR but there is no ongoing EMR measurement (step 600). If so, the UE is allowed to enter into the relaxed measurement mode (i.e., the UE selects the relaxed measurement mode) (step 602). Otherwise, the UE is not allowed to enter into the relaxed measurement mode (i.e., the UE selects the normal mode) (step 604).

Methods in the UE Related to a Second Embodiment

Figure 7:
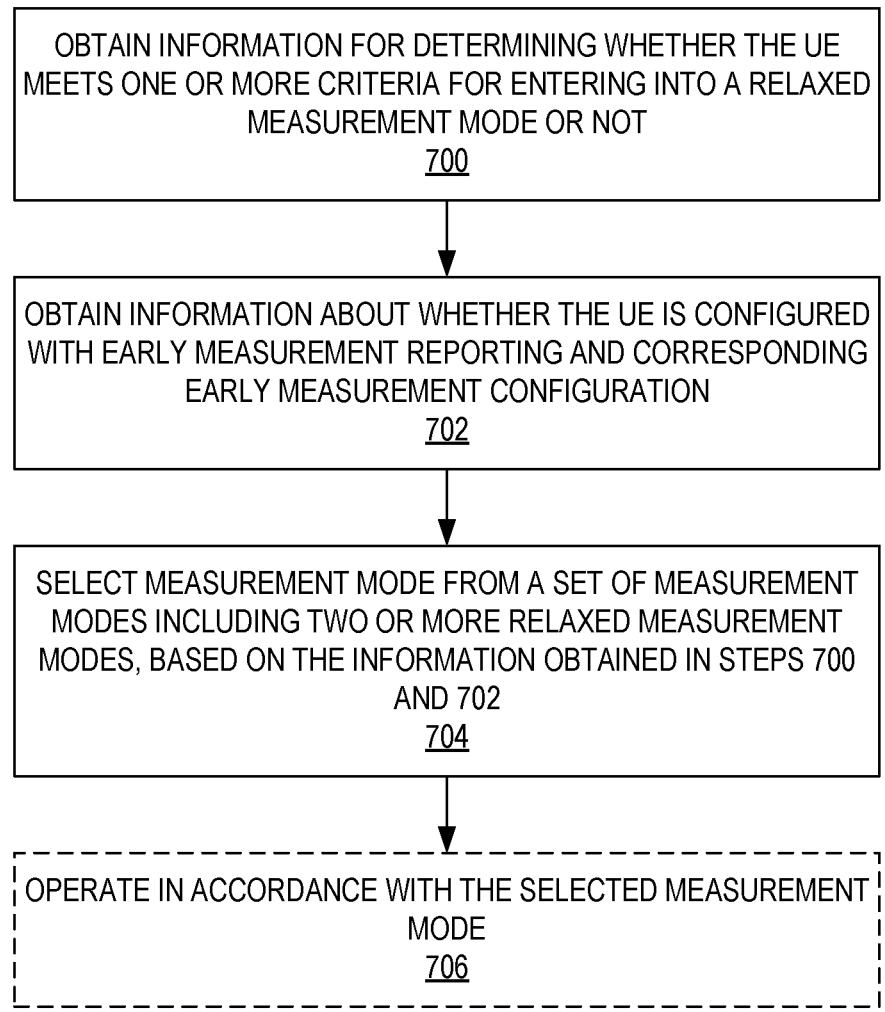
FIG. 7 is a flow chart that illustrates the operation of a UE in accordance with a second embodiment of the present disclosure.

FIG. 7 is a flow chart that illustrates the operation of a UE (e.g., a UE 112) in accordance with a second embodiment of the present disclosure. As illustrated, UE performs at least the following steps:
- Step 700: The UE obtains information for determining whether the UE meets one or more criteria for entering into a relaxed measurement mode or not.
- Step 702: The UE obtains information related to early measurement reporting and its current status. In some embodiments, this information related to current status includes e.g., whether it has completed the measurements, T331 timer is running, and/or the like.
- Step 704: The UE evaluates and selects the measurement mode from a set of measurement modes including two or more relaxed measurement modes (also referred to herein as relaxation modes) and, optionally, a normal measurement mode, based on the obtained information.
- Step 706 (Optional): The UE operates in accordance with the selected measurement mode.

These steps are described in detail in below subsections.

Step 700:

Step 700 is similar to step 200 of FIG. 2. It is further assumed that there are multiple relaxed measurements modes of different orders associated with different requirements. The relaxation modes of different orders are called RM1, RM2, RM3 etc. and their relations are as follows:
- NM is less relaxed than RM1 where NM is the normal or legacy measurement mode
- RM1 is less relaxed than RM2,
- RM2 is less relaxed than RM3,
- etc.

Figure 8:
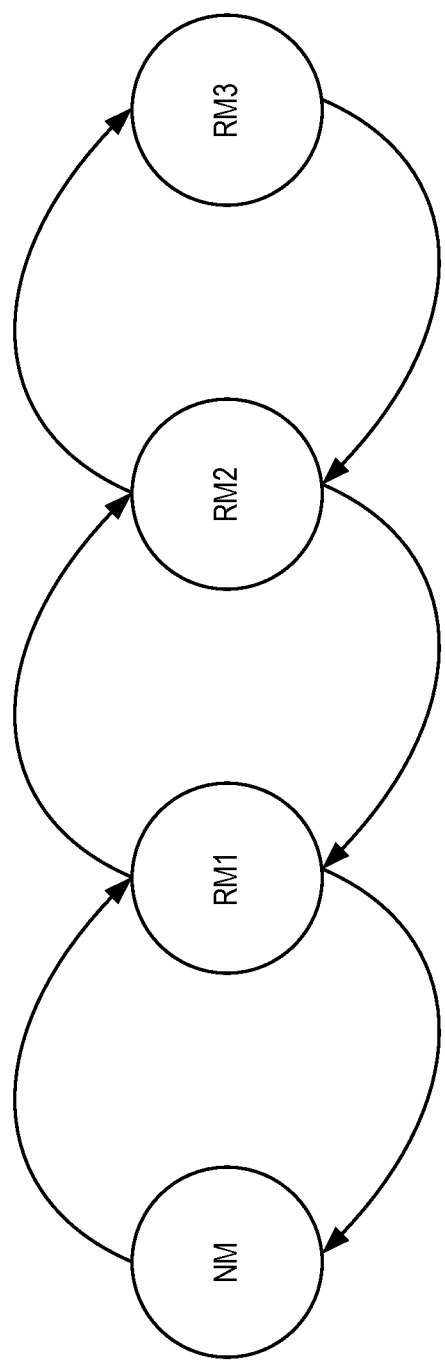
FIG. 8 illustrates an example of multiple measurement modes and transitions between the measurement modes in accordance with an embodiment of the present disclosure.

The UE may switch between the different measurement modes as shown. One example of multiple measurement modes and transitions between the measurement modes is illustrated in FIG. 8.

Step 702:

In this step, the UE obtains information related to early measurement reporting configuration as described above with respect to step 202 of FIG. 2. In some embodiments, the UE further obtains information related to its current EMR status or on-going activities in the UE related to EMR (e.g., as described above with respect to step 202 of FIG. 2).

Steps 704 and 706 (Optional):

In step 704, the UE evaluates the obtained information and selects a measurement mode based on the result of the evaluation. In step 706, the UE may perform one or more measurements based on the selected measurements. Additionally or alternatively, the UE may receive measurements or reference signals for measurement in step 706.

In a first aspect of the second UE embodiment, if the evaluation results show that the UE is configured with EMR, then the UE is allowed to enter one of the relaxed measurement modes of a certain order, e.g., RM1, RM2 etc., provided that the UE has fulfilled the criteria for entering that mode. In this mode, the UE is allowed to measure on carriers for EMR with less stringent requirements. In one embodiment, the NM is associated with high-mobility UEs, the less relaxed modes such as RM1 and RM2 are associated with semi-stationary UEs, and high relaxed modes such as RM3 is associated with stationary UEs. The order of the RM mode used by the UE can be determined by the UE based on a rule, which can be pre-defined (e.g., depends on EMR configuration) and/or configured by the NW1.

For example, if the UE has selected RM1, this means that the UE is not fully stationary, instead it might be moving, and that the UE is probably also not in the cell-edge area. Under these conditions, the UE will be required to monitor a certain number carriers or cells for mobility purposes. But these carriers or cells are monitored in a relaxed manner, which means for example that UE can be allowed a longer time for identifying those cells and/or a longer time for measuring on those cells. Therefore, the UE may perform those measurements less frequently with a relaxed measurement rate. Under these conditions, also measuring on the carriers/cells indicated by the EMR configuration may not lead to substantially more UE power consumption.

In some embodiments, if the UE is not configured with EMR, then the UE is allowed to enter the RM (as in the first embodiment described above with respect to FIG. 2) provided the criteria associated with those modes are fulfilled.

In a second aspect of the second UE embodiment, the UE selects a measurement mode of a certain order based on whether EMR is configured and its current status (on-going EMR activity information) as exemplified and listed in the description of step 702 (or the description of step 202 of FIG. 2). If the UE is configured with EMR and UE is involved in an ongoing EMR activity, then the UE selects a measurement mode (e.g., NM) that allows the UE to measure on the carriers according to EMR configuration, or at least complete the ongoing EMR activity. This selected mode will allow the UE to measure on the cells/carriers according to the EMR configuration regardless of any other criteria for entering other measurement modes are fulfilled or not. Alternatively, the UE may delay the evaluation for entering other measurement modes by a certain time until the UE has completed the on-going EMR activity.

On the other hand, if the UE is not configured with any type of EMR reporting or if configured with EMR and there is no on-going EMR activity, then the UE is allowed to select any of the relaxed measurement modes of any degree provided it fulfills the criteria associated with that mode. For example, if the UE has completed the measurements on the carriers configured with EMR but has not yet reported the EMR results then the UE is allowed to enter into any of the RM modes. For example, if the UE has completed the measurements for EMR then the UE may stop the timer associated with the EMR, e.g., T331.

Figure 9:
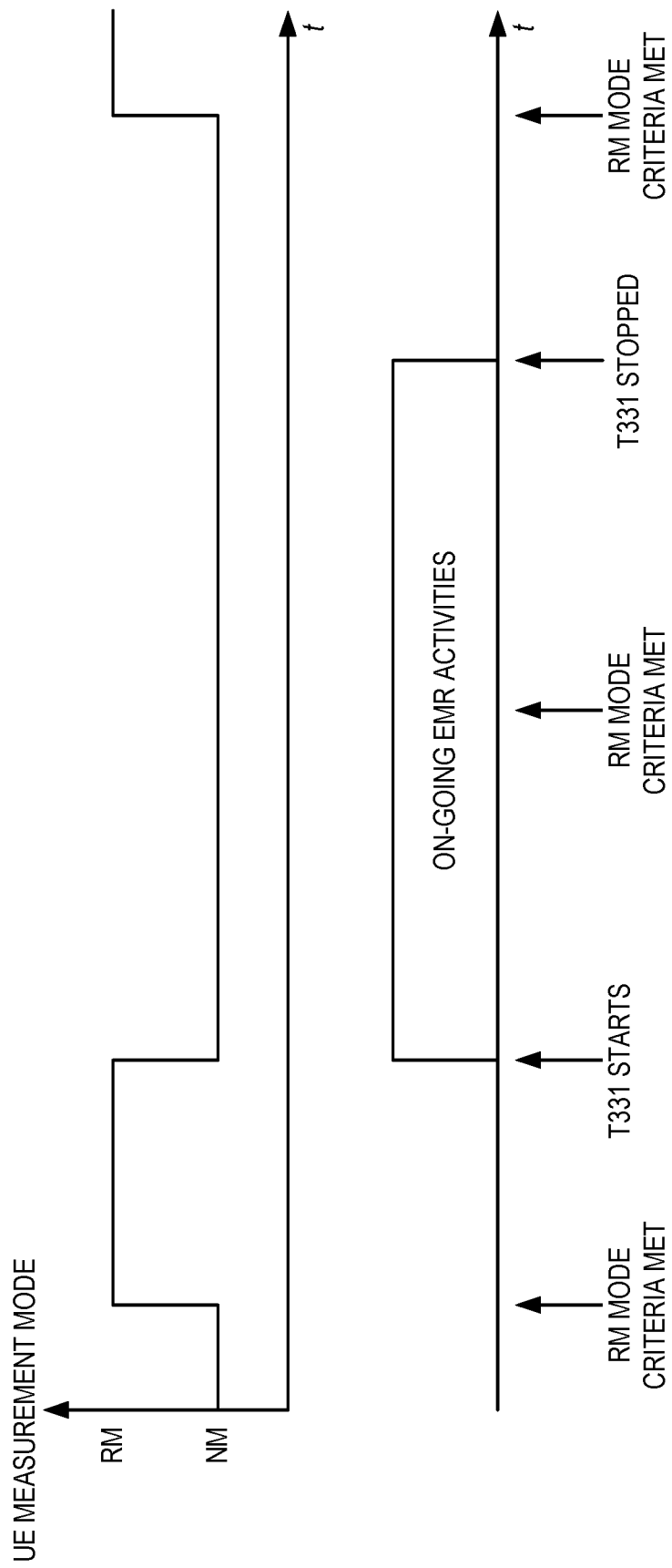
FIG. 9 illustrates an example of the interaction between the state of early measurement reporting (EMR) activities and switching of measurement modes in accordance with an example embodiment of the present disclosure.

An example of the interaction between status of EMR activities and switching of measurement modes is illustrated in FIG. 9.

In one another example, it is assumed that measurement relaxation is performed in the frequency domain as described with respect to step 204 of FIG. 2. The parameters $B_{EMR}$ and $B_m$ described with respect to step 204 of FIG. 2 also apply here. If the $B_{EMR}$ and $B_m$ overlap partly in frequency domain corresponding to Case C in FIG. 4, then the UE may enter the relaxed measurement mode (RM) but it with certain order (see FIG. 8) which allows the UE to meet relaxed EMR requirements.

Additional Aspects

Figure 10:
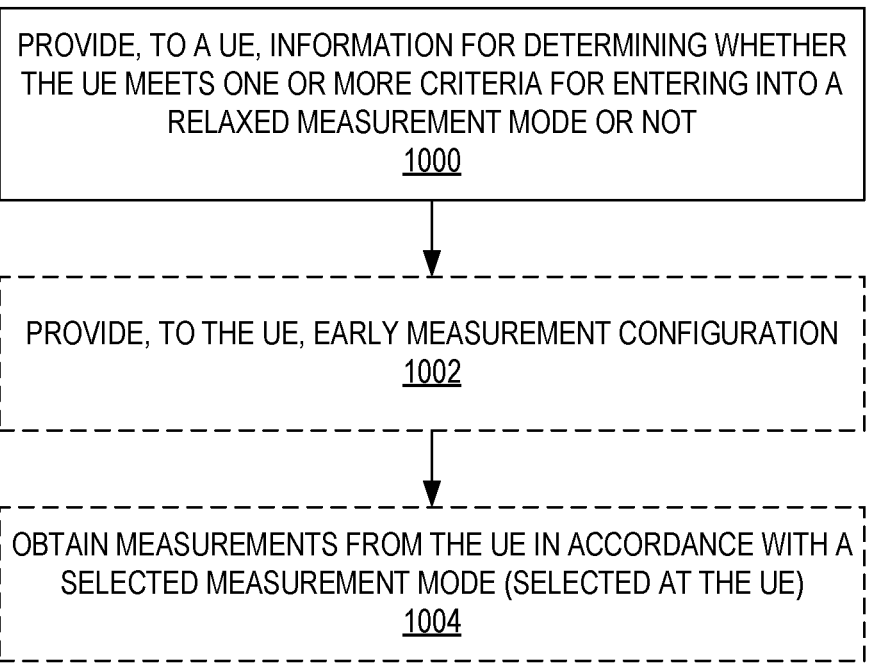
FIG. 10 is a flow chart that illustrates the operation of a network node (e.g., a base station) in accordance with at least some aspects of the embodiments of the present disclosure.

FIG. 10 is a flow chart that illustrates the operation of a network node (e.g., a base station such as, e.g., base station 102) in accordance with at least some aspects of the embodiments described above. Optional steps are represented with dashed lines/boxes. As illustrated, the network nodes sends, to a UE (e.g., UE 112), information for determining whether the UE meets one or more criteria for entering into a relaxed measurement mode or not (step 1000). For additional details regarding this information, see the description of step 200 of FIG. 2 and step 700 of FIG. 7 above. Optionally, the network node also sends, to the UE, an early measurement configuration, as described above (step 1002). Optionally, the network node obtains measurements from the UE in accordance with a measurement mode selected, at the UE, based on the provided information, as described above (step 1004).

The following describes an example implementation of at least some aspects of the embodiments descried herein in the form of observations and proposals related to Radio Resource Management (RRM) impact of NR UE power savings in 3GPP.

The RRM impact and requirements for UE power saving work item was discussed at a RAN4 meeting and following agreements were made:

- The following options should be considered for RRM measurement relaxation if the measurement relaxation criteria defined in RAN2 are met in next meeting:
  Option 1: RRM measurement relaxation by allowing measurements with longer intervals, and/or by reducing the number of carriers to be measured;
  Option2: RRM measurement relaxation of neighbour cell monitoring in LTE MTC/NB-IoT can be reused for defining the RRM requirements for UE power saving in NR
  Other option is not precluded.

Here, different options are discussed by taking into account the agreements in other working groups and some observations and proposals are provided.

According to the work item objective in R4-1910948, "WF on Power Saving RRM requirements," CATT, Vivo, October 2019, the RAN4 objective targets RRM measurement for neighbor cells in RRC_IDLE/INACTIVE states. This means, no impact to existing serving cell measurement requirements in RRC_IDLE/INACTIVE states and no impact to any of the RRC_CONNECTED state requirements.

Observation: No impact to existing serving cell requirements in IDLE/INACTIVE/CONNECTED states and no impact to neighbor cell requirements in CONNECTED state.

In regard to RRM requirements, RAN2 has reached following agreements for the NR RRM measurement relaxation procedures:

Firstly, given the limited remaining time left in the work item, RAN4 is to focus on developing the RRM requirements only for the criteria agreed in RAN2 which are for two types of UEs:

Low mobility UEs, and

Cell-edge UEs.

The detailed criteria, which includes the triggering conditions based on signal strength and quality measurements are currently under RAN2 discussions which makes it quite difficult to proceed in RAN4.

The RAN4 RRM impact depends on following:

Type of measurements that are relaxed

The type of measurements to be relaxed is being discussed in RAN2. In our view and understanding, the measurement relaxation considered in the work item should be the existing averaged neighbor cell measurements such as SS-RSRP, SS-RSRQ. Since this triggering conditions are decided by RAN2, it is proposed that RAN4 waits for further RAN2 progress.

Number of carriers to be measured

In R4-1910948, one of the options to be considered is to reduce the number of carriers to be measured. But this is already configurable, and the network has the flexibility to configure the carriers differently for different deployment scenarios. Moreover, since the existing measurement requirements are scaled with the number carriers monitored, the effective power consumption due to measurements for a given carrier remains the same. Hence, the gain of limiting the number of carriers to be monitored is limited.

Another option that was discussed in R4-1912130, "UE core requirements for UE power saving", Nokia, Nokia Shanghai Bell is related to having a carrier based inter-frequency search thresholds which is different from the legacy procedure where the same search thresholds apply to all inter-frequency carriers. In our view, this approach can be especially Agreements 1. Measurement relaxation criteria can consider both low mobility and UE location in the cell (e.g. whether the UE is in cell-edge).
2. UE may activate relaxed measurement criteria if at least any of the following conditions are met:
   a) Serving Cell measurement does not change more than a relative threshold during a time period
   - LTE relaxed monitoring criteria in 36.304 is considered as a baseline. Additional enhancements to address aspects that are specific to NR can be considered.
   b) UE is not a cell edge, meaning that serving cell/beam RSRP/RSRQ/SINR is above a threshold
   FFS: Whether neighbour cell RSRP should also be considered.
...................
1. Network can configure the triggering criteria independently (i.e. either cell-edge or low mobility or both)
2. Cell-edge criteria will not consider neighbour cell measurements useful when prioritizing certain inter-frequency carriers while down-prioritizing others, and it is somewhat similar to having a higher-priority carrier. But the difference is that, this particular carrier can be searched and evaluated based on requirements associated with normal carriers unlike higher priority carrier. However, this approach may not lead to any improved UE power consumption because the carriers are already scaled by $K_{carrier}$, and from a UE point of view measuring on 1 carrier or 8 carriers is quite similar in terms of power consumption over a given time.

There is a clear advantage of following the relaxed cell monitoring procedure introduced in LTE for MTC/NB-IoT over the option of reducing the number of carrier because, with the former approach, the UE is allowed to completely skip measuring on all type of neighbor cells (both intra-frequency and inter-frequency) provided the relaxed cell monitoring criteria is met. This approach may lead to significantly more gain in UE power consumption. Nevertheless, it is noteworthy that the relaxed cell monitoring criteria was designed for stationary or low-mobility UEs while the mobility of NR UEs can be higher. Measurement relaxation for UEs not operating at cell-edge may require some new triggering conditions, and RAN4 should wait for further RAN2 agreement on this case. Hence, the following observations and proposals:

Observation #1: UE power consumption improvement by reducing the number of carriers is limited.

Observation #2: UE power consumption improvement following the LTE relaxed cell monitoring approach may work well for low-mobility UEs.

Proposal #1: RAN4 shall aim to reuse the RRM requirements specified for the LTE relaxed neighbor cell monitoring procedures for NR UE power consumption under low-mobility criteria.

Proposal #2: RAN4 shall wait for further RAN2 progress for RRM requirements work based on not cell-edge criteria.

Relaxation with longer intervals

Another option considered in R4-1910948 is relaxation by allowing measurements with longer intervals. In our view, then potential power consumption gain achievable with this option is not comparable to the gain that can be achieved with LTE relaxed cell monitoring. Since the UE is not required to measure on any neighbor cells at all when the relaxed cell monitoring criteria is met, this option will clearly lead to much more reduced UE power consumption than when measuring with longer intervals. Nevertheless, whether this option can be used for the not cell-edge criteria is for future study and depends on RAN2 agreements. Thus, the following observation is made:

Observation #3: Following LTE relaxed cell monitoring approach can lead to significantly more UE power consumption gain than performing the neighbor cell measurements with longer intervals.

In regard to RAN4 RRM impact on existing procedures, in Release 16, EMR is being introduced for measurements on E-UTRA and NR carriers to facilitate multi-carrier operation with NR, e.g., NR CA or MR-DC. The measurements are performed in RRC_IDLE or RRC_INACTIVE states and the purpose is to enable the gNB/eNB to use the results to quickly setup or establish the multicarrier operation. EMR activities should be coordinated with the UE power saving procedures, otherwise EMR performance can be degraded. The UE power saving procedures is likely to be triggered autonomously in the UE when it has fulfilled the associated criteria. This means the serving gNB may not know whether or when the UE will perform the neighbor cell measurements in relaxed manner, denoted relaxed measurement mode. Therefore, in order to secure the EMR performance, it is important that the UE does not enter the relaxed measurement mode when configured with EMR reporting.

Alternatively, the EMR reporting can be allowed when the UE is not in cell-edge but with relaxed requirements, e.g. the reporting delay can be extended. The rationale is that the UE that is not at cell-edge is likely a moving UE or semi-stationary UE, and may therefore need to perform some form neighbor cell measurements. Since UE is anyways measuring on neighbor cells, measurements on carriers indicated by EMR configuration can also be allowed.

Another option that might work for all types of UEs is to account for the status of T331 timer into the criteria used for entering the measurement relaxation mode. T331 timer is used in the EMR reporting and the purpose is that the UE shall perform and report the measurements while T331 timer is running. In other words, if T331 timer is running it is an indication that the UE is performing EMR activities and therefore it should not be allowed to enter the relaxed measurement modes.

Based on the above, the following observation and proposal is:

Observation #4: Relaxed measurement mode procedures (low mobility or cell-edge criteria) can degrade the EMR performance if they are not coordinated.

Proposal #3: The UE is not allowed to enter any relaxed measurement modes (e.g. based on low-mobility or cell-edge criteria) if UE is configured with early measurement reporting (EMR) and T331 timer is running.

Figure 11:
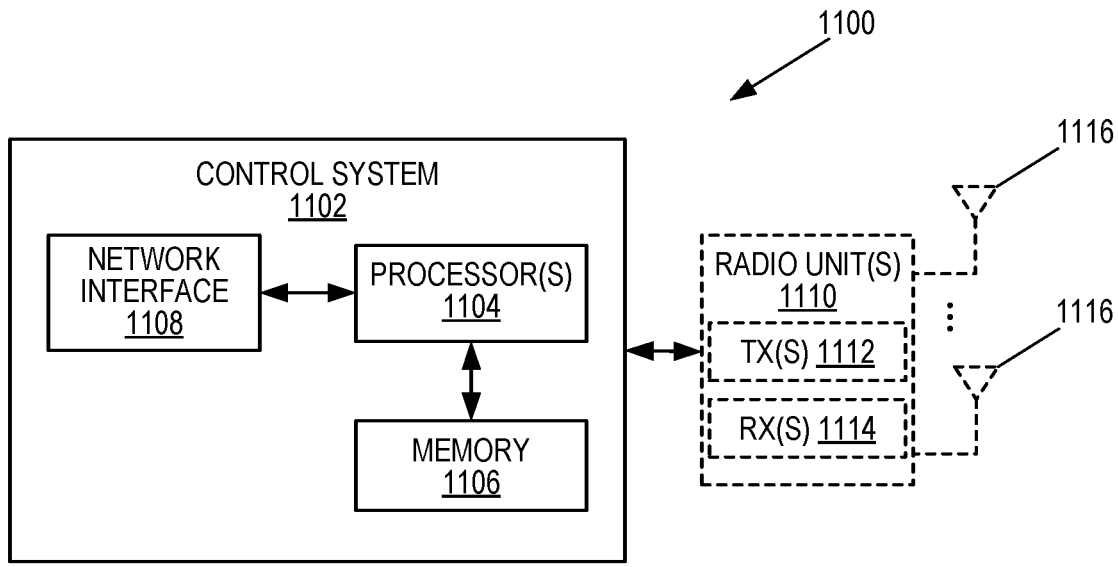
FIGS. 11, 12, and 13 are schematic block diagrams of example embodiments of a radio access node.

FIG. 11 is a schematic block diagram of a radio access node 1100 according to some embodiments of the present disclosure. Optional features are represented by dashed boxes. The radio access node 1100 may be, for example, a base station 102 or 106 or a network node that implements all or part of the functionality of the base station 102 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein (e.g., one or more functions of a network node described above, e.g., with respect to FIG. 10). In some embodiments, the function(s) are implemented in software that is stored, e.g., in the memory 1106 and executed by the one or more processors 1104.

Figure 12:
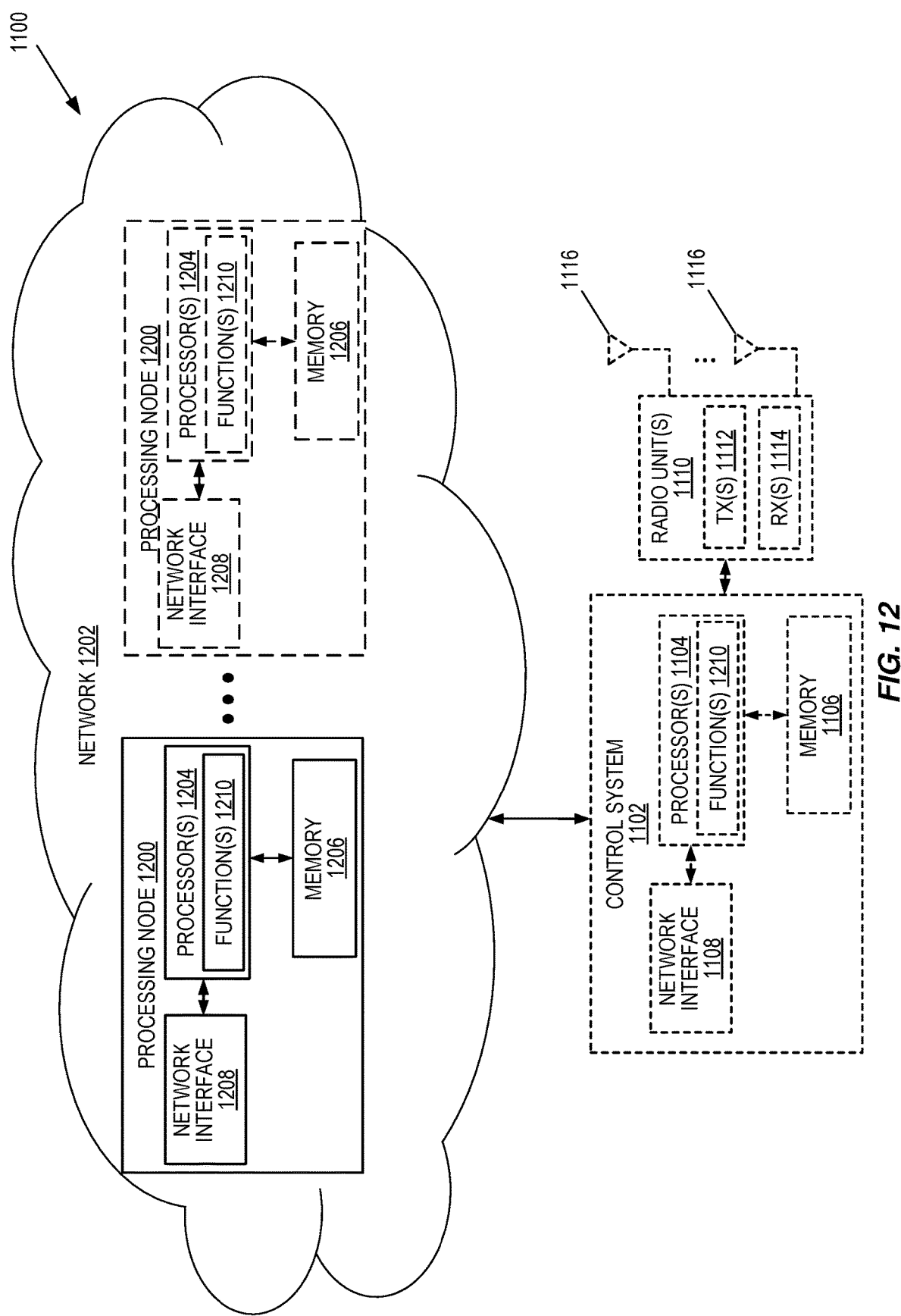

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the radio access node 1100 described herein (e.g., one or more functions of a network node described above, e.g., with respect to FIG. 10) are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
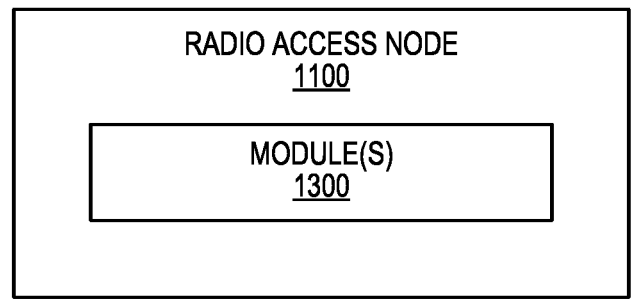

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein (e.g., one or more functions of a network node described above, e.g., with respect to FIG. 10). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
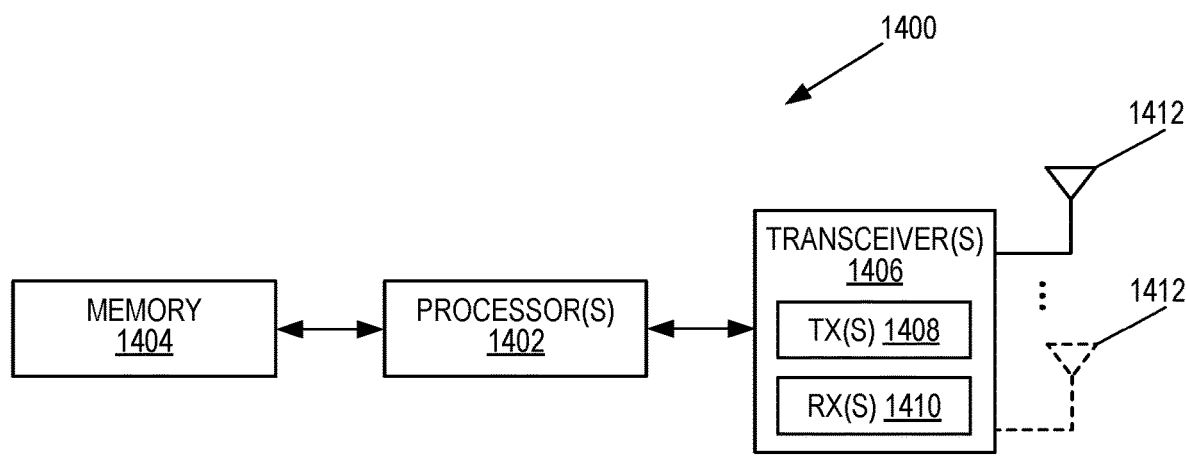
FIGS. 14 and 15 are schematic block diagrams of example embodiments of a wireless communication device.

FIG. 14 is a schematic block diagram of a wireless communication device 1400 (e.g., a UE 112) according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above (e.g., one or more functions of a UE or UE 112 described above with respect to, e.g., FIGS. 2, 4, 7, 8, and 9) may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein (e.g., one or more functions of a UE or UE 112 described above with respect to, e.g., FIGS. 2, 4, 7, 8, and 9) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
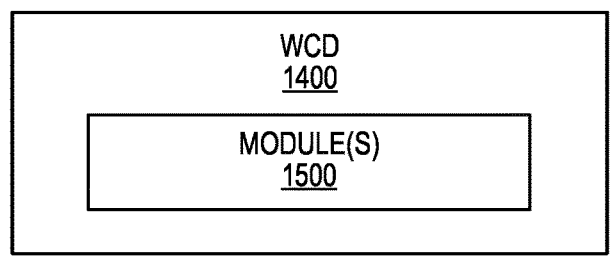

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein (e.g., one or more functions of a UE or UE 112 described above with respect to, e.g., FIGS. 2, 4, 7, 8, and 9).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

The following enumerated embodiments provide some specific embodiments of the present disclosure. Combinations of the features described in the enumerated embodiments are within the scope of the disclosure.

Group A Embodiments

Embodiment 1: A method performed by a wireless communication device (112): obtaining (200; 700) information for determining whether the wireless communication device (112) meets one or more criteria for entering into one or more relaxed measurement modes; obtaining (202; 702) information about whether the wireless communication device (112) is configured with early measurement reporting; and selecting (204; 704) a measurement mode from a set of measurement modes comprising the one or more relaxed measurement modes and a normal (i.e., non-relaxed) measurement mode, based on the obtained information.

Embodiment 2: The method of embodiment 1 wherein the one or more relaxed measurement modes are a single relaxed measurement mode.

Embodiment 3: The method of embodiment 1 wherein the one or more relaxed measurement modes are two or more relaxed measurement modes.

Embodiment 4: The method of embodiment 3 wherein the two or more relaxed measurement modes have different degrees of measurement relaxation.

Embodiment 5: The method of any of embodiments 1 to 4 wherein each of the one or more relaxed measurement modes is a measurement mode in which one or more parameters of the normal measurement mode are relaxed.

Embodiment 5: The method of embodiment 5 wherein the one or more parameters comprise:
a) a measurement frequency;
b) a measurement duration (i.e., a measurement time period);
c) a number of carriers or cells on which measurements are to be performed by the wireless communication device;
d) a frequency bandwidth over which the wireless device is to perform measurements; or
e) any combination of two or more of (a)-(d).

Embodiment 7: The method of any of embodiments 1 to 6 wherein the information for determining whether the wireless communication device (112) meets the one or more criteria for entering into the one or more relaxed measurement modes comprises the one or more criteria.

Embodiment 8: The method of embodiment 7 wherein the one or more criteria comprise a criterion that relaxed monitoring is configured or enabled for the wireless communication device (112).

Embodiment 9: The method of embodiment 7 or 8 wherein the one or more criteria comprise one or more mobility related criterion.

Embodiment 10: The method of any of embodiments 7 to 9 wherein the one or more criteria comprise a criterion related to whether the wireless communication device (112) is in a cell edge area or not.

Embodiment 11: The method of embodiment 7 wherein the one or more criteria comprise a criterion that the wireless communication device (112) be explicitly configured to operate in a particular one of the one or more relaxed measurement modes.

Embodiment 12: The method of any of embodiments 1 to 11 wherein the information about whether the wireless communication device (112) is configured with early measurement reporting comprises an early reporting measurement configuration of the wireless communication device (112), information about whether there is an ongoing early measurement activity at the wireless communication device (112), or both.

Embodiment 13: The method of any of embodiments 1 to 12 wherein selecting (204; 704) the measurement mode comprises: determining that the wireless communication device (112) meets the one or more criteria for entering into at least one of the one or more relaxed measurement modes; determining that the wireless communication device (112) is not configured with any early measurement reporting configuration; and selecting one of the at least one of the one or more relaxed measurement modes upon determining that the wireless communication device (112) meets the one or more criteria for entering into the at least one of the one or more relaxed measurement modes and determining that the wireless communication device (112) is not configured with any early measurement reporting configuration.

Embodiment 14: The method of any of embodiments 1 to 12 wherein selecting (204; 704) the measurement mode comprises: selecting one of the set of measurement modes based on a comparison of an early measurement reporting configuration with which the wireless communication device (112) is configured and a relaxed measurement configuration of the relaxed measurement mode.

Embodiment 15: The method of any of embodiments 1 to 12 wherein selecting (204; 704) the measurement mode comprises: determining that the wireless communication device (112) meets the one or more criteria for entering into at least one of the one or more relaxed measurement modes; determining that the wireless communication device (112) is configured with an early measurement reporting configuration; determining that the early measurement reporting configuration at least partially overlaps (e.g., in time domain and/or frequency domain) with a relaxed measurement configuration of the at least one of the one or more relaxed measurement modes; and selecting one of the at least one of the one or more relaxed measurement modes upon determining that the wireless communication device (112) meets the one or more criteria for entering into the at least one of the one or more relaxed measurement modes, determining that the wireless communication device (112) is configured with any early measurement reporting configuration, and determining that the early measurement reporting configuration at least partially overlaps with the relaxed measurement configuration of the at least one of the one or more relaxed measurement modes.

Embodiment 16: The method of any of embodiments 1 to 12 wherein selecting (204; 704) the measurement mode comprises: determining that the wireless communication device (112) meets the one or more criteria for entering into at least one of the one or more relaxed measurement modes; determining that the wireless communication device (112) is configured with an early measurement reporting configuration but that there is no ongoing early measurement activity at the wireless communication device (112); and selecting one of the at least one of the one or more relaxed measurement modes upon determining that the wireless communication device (112) meets the one or more criteria for entering into the at least one of the one or more relaxed measurement modes and determining that the wireless communication device (112) is configured with an early measurement reporting configuration but that there is no ongoing early measurement activity at the wireless communication device (112).

Group B Embodiments

Embodiment 17: A method performed by a base station comprising: providing, to a wireless communication device (112), information for determining whether the wireless communication device (112) meets one or more criteria for entering into one or more relaxed measurement modes.

Embodiment 18: The method of embodiment 17 wherein the one or more relaxed measurement modes are a single relaxed measurement mode.

Embodiment 19: The method of embodiment 17 wherein the one or more relaxed measurement modes are two or more relaxed measurement modes.

Embodiment 20: The method of embodiment 19 wherein the two or more relaxed measurement modes have different degrees of measurement relaxation.

Embodiment 21: The method of any of embodiments 17 to 20 wherein each of the one or more relaxed measurement modes is a measurement mode in which one or more parameters of the normal measurement mode are relaxed.

Embodiment 22: The method of embodiment 21 wherein the one or more parameters comprise:
 a) a measurement frequency;
 b) a measurement duration (i.e., a measurement time period);
 c) a number of carriers or cells on which measurements are to be performed by the wireless communication device;
 d) a frequency bandwidth over which the wireless device is to perform measurements; or
 e) any combination of two or more of (a)-(d).

Embodiment 23: The method of any of embodiments 17 to 22 wherein the information for determining whether the wireless communication device (112) meets the one or more criteria for entering into the one or more relaxed measurement modes comprises the one or more criteria.

Embodiment 24: The method of embodiment 23 wherein the one or more criteria comprise a criterion that relaxed monitoring is configured or enabled for the wireless communication device (112).

Embodiment 25: The method of embodiment 23 or 24 wherein the one or more criteria comprise one or more mobility related criterion.

Embodiment 26: The method of any of embodiments 23 to 25 wherein the one or more criteria comprise a criterion related to whether the wireless communication device (112) is in a cell edge area or not.

Embodiment 27: The method of embodiment 23 wherein the one or more criteria comprise a criterion that the wireless communication device (112) be explicitly configured to operate in a particular one of the one or more relaxed measurement modes.

Group C Embodiments

Embodiment 28: A wireless communication device comprising: processing circuitry configured to perform any of the steps of any of the Group A embodiments; and power supply circuitry configured to supply power to the wireless communication device.

Embodiment 29: A base station comprising: processing circuitry configured to perform any of the steps of any of the Group B embodiments; and power supply circuitry configured to supply power to the base station.

Embodiment 30: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).
 3GPP Third Generation Partnership Project
 5G Fifth Generation
 5GC Fifth Generation Core
 5GS Fifth Generation System
 AF Application Function
 AMF Access and Mobility Function
 AN Access Network
 AP Access Point
 ASIC Application Specific Integrated Circuit
 AUSF Authentication Server Function
 CPU Central Processing Unit
 DN Data Network
 DSP Digital Signal Processor
 eNB Enhanced or Evolved Node B
 EPS Evolved Packet System
 E-UTRA Evolved Universal Terrestrial Radio Access
 FPGA Field Programmable Gate Array
 gNB New Radio Base Station
 gNB-DU New Radio Base Station Distributed Unit
 HSS Home Subscriber Server
 IoT Internet of Things
 IP Internet Protocol
 LTE Long Term Evolution
 MME Mobility Management Entity
 MTC Machine Type Communication
 NEF Network Exposure Function
 NF Network Function
 NR New Radio
 NRF Network Function Repository Function
 NSSF Network Slice Selection Function
 OTT Over-the-Top
 PC Personal Computer PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless communication device in a cellular communications system, the method comprising:
obtaining first information for determining whether the wireless communication device meets one or more criteria for entering into one or more relaxed measurement modes;
obtaining second information about whether the wireless communication device is configured with early measurement reporting; and
selecting a measurement mode from a set of measurement modes comprising the one or more relaxed measurement modes and a normal measurement mode, wherein selecting the measurement mode comprises:
determining, based on the first information, whether the wireless communication device meets the one or more criteria for entering into the one or more relaxed measurement modes;
selecting one of the set of measurement modes based on upon results of determining whether the wireless communication device meets the one or more criteria for entering into the one of the one or more relaxed measurement modes and based on the second information,
determining, based on the second information, that the wireless communication device is configured with an early measurement reporting configuration, and
selecting one of the set of measurement modes based on upon results of determining whether the wireless communication device meets the one or more criteria for entering into the one of the one or more relaxed measurement modes and based on the second information comprises selecting the normal measurement mode upon determining that the wireless communication device is configured with an early measurement reporting configuration.

2. The method of claim 1, wherein:
determining whether the wireless communication device meets the one or more criteria for entering into the one or more relaxed measurement modes comprises determining that the wireless communication device meets the one or more criteria for entering into at least one of the one or more relaxed measurement modes;
selecting the measurement mode further comprises determining, based on the second information, that the wireless communication device is not configured with an early measurement reporting configuration; and
selecting the one of the set of measurement modes based on upon results of determining whether the wireless communication device meets the one or more criteria for entering into the one of the one or more relaxed measurement modes and based on the second information comprises selecting one of the at least one of the one or more relaxed measurement modes upon determining that the wireless communication device meets the one or more criteria for entering into the at least one of the one or more relaxed measurement modes and determining that the wireless communication device is not configured with an early measurement reporting configuration.

3. The method of claim 1, wherein:
selecting the measurement mode further comprises determining, based on the second information, that the wireless communication device is configured with an early measurement reporting configuration but that there is no ongoing early measurement activity at the wireless communication device; and
selecting one of the set of measurement modes based on upon results of determining whether the wireless communication device meets the one or more criteria for entering into the one of the one or more relaxed measurement modes and based on the second information comprises selecting one of the one or more relaxed measurement modes upon determining that the wireless communication device meets the one or more criteria for entering into the one of the one or more relaxed measurement modes and determining that the wireless communication device is configured with an early measurement reporting configuration but that there is no ongoing early measurement activity at the wireless communication device.

4. The method of claim 1, wherein:
selecting the measurement mode further comprises determining, based on the second information, that the wireless communication device is configured with an early measurement reporting configuration but and there is an ongoing early measurement activity at the wireless communication device; and
selecting one of the set of measurement modes based on upon results of determining whether the wireless communication device meets the one or more criteria for entering into the one of the one or more relaxed measurement modes and based on the second information comprises selecting the normal measurement mode upon determining that the wireless communication device is configured with an early measurement reporting configuration but and there is an ongoing early measurement activity at the wireless communication device.

5. The method of claim 1, wherein the wireless communication device is in an idle or inactive state.

6. The method of claim 3, wherein determining that the wireless communication device is configured with an early measurement reporting configuration but that there is no ongoing early measurement activity at the wireless communication device comprises determining that an early measurement duration timer is not running.

7. The method of claim 4, wherein determining that the wireless communication device is configured with an early measurement reporting configuration and there is an ongoing early measurement activity at the wireless communication device comprises determining that an early measurement duration timer is running.

8. The method of claim 1, wherein the one or more relaxed measurement modes are a single relaxed measurement mode.

9. The method of claim 1, wherein the one or more relaxed measurement modes comprise two or more relaxed measurement modes that have different degrees of measurement relaxation.

10. The method of claim 1, wherein each of the one or more relaxed measurement modes is a measurement mode in which one or more parameters of the normal measurement mode are relaxed.

11. The method of claim 10, wherein the one or more parameters comprise:
a) a measurement frequency;
b) a measurement duration;
c) a number of carriers or cells on which measurements are to be performed by the wireless communication device;
d) a frequency bandwidth over which the wireless communication device is to perform measurements; or
e) any combination of two or more of (a)-(d).

12. The method of claim 1, wherein the first information for determining whether the wireless communication device meets the one or more criteria for entering into the one or more relaxed measurement modes comprises information related to mobility of the wireless communication device.

13. The method of claim 1, wherein the first information for determining whether the wireless communication device meets the one or more criteria for entering into the one or more relaxed measurement modes comprises information that indicates whether the wireless communication device is located near a cell edge.

14. The method of claim 1, wherein the first information for determining whether the wireless communication device meets the one or more criteria for entering into the one or more relaxed measurement modes comprises an explicit indicator signaled from a network node.

15. The method of claim 1, wherein the first information for determining whether the wireless communication device meets the one or more criteria for entering into the one or more relaxed measurement modes comprises the one or more criteria.

16. The method of claim 15, wherein the one or more criteria comprise:
a criterion that relaxed monitoring is configured or enabled for the wireless communication device;
one or more mobility related criteria;
a criterion related to whether the wireless communication device is in a cell edge area or not; or
a criterion that the wireless communication device be explicitly configured to operate in a particular one of the one or more relaxed measurement modes.

17. The method of claim 1, wherein the first information for determining whether the wireless communication device meets the one or more criteria for entering into the one or more relaxed measurement modes comprises Srxlev and $Srxlev_{Ref}$.

18. The method of claim 1, wherein the second information about whether the wireless communication device is configured with early measurement reporting comprises an early reporting measurement configuration of the wireless communication device, information about whether there is an ongoing early measurement activity at the wireless communication device, or both.

19. A wireless communication device for a cellular communications system, the wireless communication device comprising:
one or more transmitters;
one or more receivers; and
processing circuitry associated with the one or more transmitters and the one or more receivers, the processing circuitry configured to cause the wireless communication device to:
obtain first information for determining whether the wireless communication device meets one or more criteria for entering into one or more relaxed measurement modes;
obtain second information about whether the wireless communication device is configured with early measurement reporting; and
select a measurement mode from a set of measurement modes comprising the one or more relaxed measurement modes and a normal measurement mode;
wherein in order to select the measurement mode, the processing circuitry is further configured to cause the wireless communication device to:
determine, based on the first information, whether the wireless communication device meets the one or more criteria for entering into the one or more relaxed measurement modes;
select one of the set of measurement modes based on upon results of determining whether the wireless communication device meets the one or more criteria for entering into the one of the one or more relaxed measurement modes and based on the second information,
determine, based on the second information, that the wireless communication device is configured with an early measurement reporting configuration, and
select one of the set of measurement modes based on upon results of determination of whether the wireless communication device meets the one or more criteria for entering into the one of the one or more relaxed measurement modes and based on the second information comprises selection of the normal measurement mode upon determining that the wireless communication device is configured with an early measurement reporting configuration.

* * * * *